United States Patent
Hibino et al.

(10) Patent No.: US 8,922,639 B2
(45) Date of Patent: Dec. 30, 2014

(54) MICROSCOPE SYSTEM

(75) Inventors: So Hibino, Yokohama (JP); Testsuya Fukushima, Hachioji (JP)

(73) Assignee: Olympus Corporation, Tokyo (JP)

( * ) Notice: Subject to any disclaimer, the term of this patent is extended or adjusted under 35 U.S.C. 154(b) by 314 days.

(21) Appl. No.: 13/618,258

(22) Filed: Sep. 14, 2012

(65) Prior Publication Data

US 2013/0076888 A1    Mar. 28, 2013

(30) Foreign Application Priority Data

Sep. 27, 2011    (JP) ................................. 2011-211624
Sep. 27, 2011    (JP) ................................. 2011-211625

(51) Int. Cl.
   *H04N 7/18*      (2006.01)
   *G02B 21/36*     (2006.01)
   *G02B 21/02*     (2006.01)
   *G02B 21/12*     (2006.01)

(52) U.S. Cl.
   CPC ............ *G02B 21/365* (2013.01); *G02B 21/025* (2013.01)
   USPC .......................................... 348/79; 359/387

(58) Field of Classification Search
   USPC ......................................................... 348/79
   See application file for complete search history.

(56) References Cited

U.S. PATENT DOCUMENTS

| | | | | |
|---|---|---|---|---|
| 8,339,702 B2* | 12/2012 | Shirota et al. | ................. | 359/381 |
| 8,355,071 B2* | 1/2013 | Yamanaka | .................... | 348/335 |
| 2004/0125459 A1* | 7/2004 | Tanitsu et al. | ................. | 359/619 |
| 2011/0149387 A1* | 6/2011 | Sukekawa | .................... | 359/368 |
| 2013/0077159 A1* | 3/2013 | Tani | .............................. | 359/387 |
| 2013/0093872 A1* | 4/2013 | Kang | ............................. | 348/79 |

FOREIGN PATENT DOCUMENTS

| | | |
|---|---|---|
| JP | 2001-059940 A | 3/2001 |
| JP | 2011-118188 A | 6/2011 |

* cited by examiner

*Primary Examiner* — Sath V Perungavoor
*Assistant Examiner* — Howard D Brown, Jr.
(74) *Attorney, Agent, or Firm* — Holtz, Holtz, Goodman & Chick PC

(57) ABSTRACT

A microscope includes a zoom optical system zooming over a sample, a zoom driving unit moving the optical system along an optical axis, an imaging unit imaging an observation image of the sample through the optical system, thereby generating image data on the sample, and a display unit displaying an image corresponding to the generated image data. A touch panel on a display screen of the display unit accepts an input corresponding to a contact position of an object. A driving control unit outputs a driving signal for changing a zoom magnification of the optical system by setting a middle point between contact positions on the touch panel corresponding to two position signals responsive to an input of the different contact positions as a zoom center position fixed without depending on the zoom magnification of the optical system when the two position signals are output from the touch panel.

18 Claims, 17 Drawing Sheets

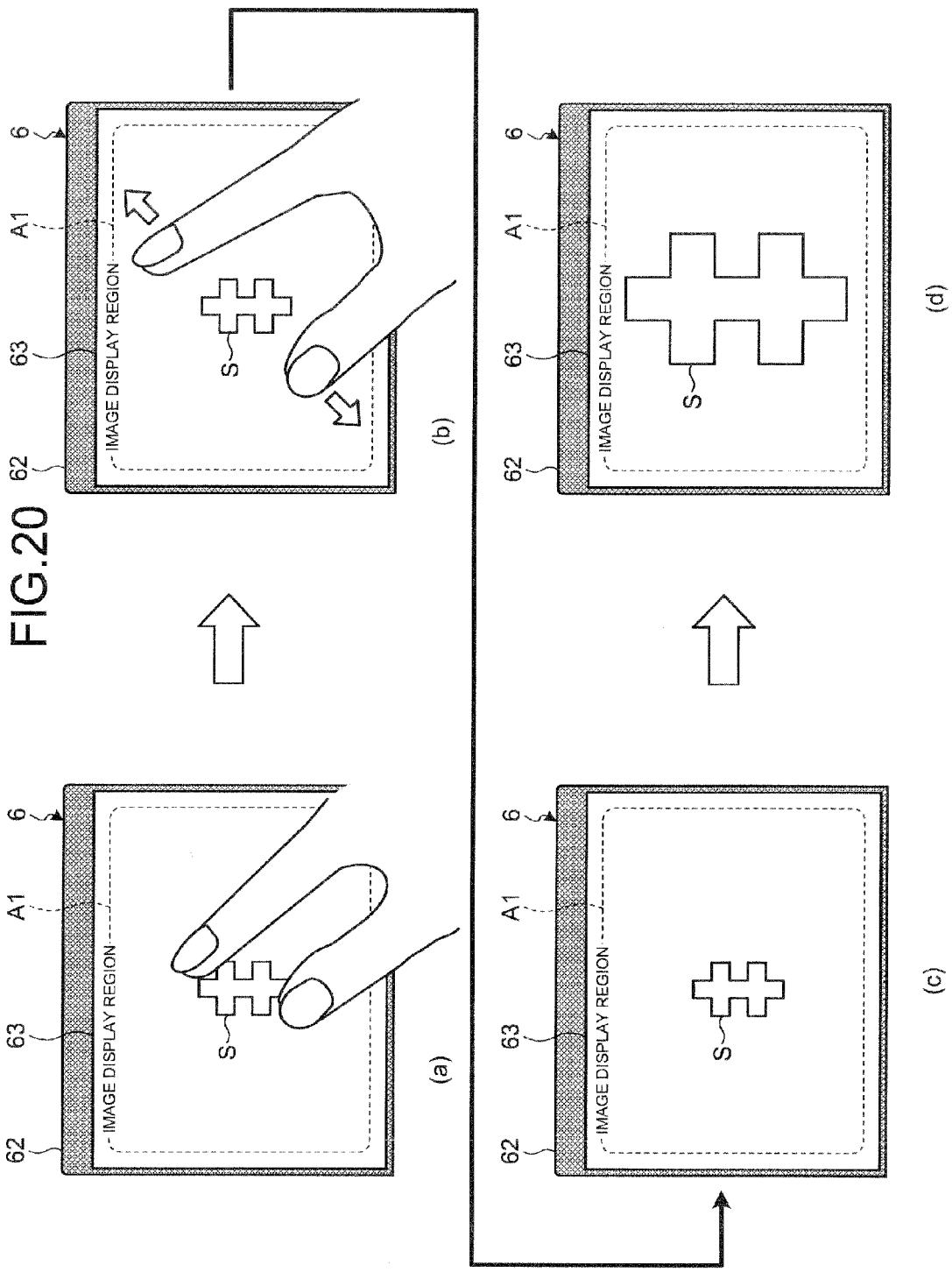

MICROSCOPE SYSTEM

CROSS-REFERENCE TO RELATED APPLICATIONS

This application is based upon and claims the benefit of priority from Japanese Patent Application No. 2011-211624 and Japanese Patent Application No. 2011-211625, filed on Sep. 27, 2011, the entire contents of which are incorporated herein by reference.

BACKGROUND OF THE INVENTION

1. Field of the Invention

The present invention relates to a microscope system for enlarging and observing a sample by a touch operation through a touch panel.

2. Description of the Related Art

In recent years, in the field of microscope systems, there is known a technique for operating each component of a microscope system through an operation controller using a touch panel instead of an operation controller such as a joy stick or a hand switch (see Japanese Laid-open Patent Publication No. 2001-59940). In this technique, a display monitor is caused to display an image of a sample mounted on a stage and operation information for accepting an input of a change in a zoom magnification, and the zoom magnification is varied in response to a position signal corresponding to a contact position of an object which is input from the touch panel and is sent from an outside so that an intuitive operation can be carried out.

SUMMARY OF THE INVENTION

A microscope system for driving each of electrically-driven units included in a microscope device to observe a sample according to an aspect of the present invention includes: a zoom optical system configured by at least one lens and capable of carrying out zooming over the sample; a zoom driving unit for moving the zoom optical system along an optical axis; an imaging unit for imaging an observation image of the sample through the zoom optical system, thereby generating image data on the sample; a display unit for displaying an image corresponding to the image data generated by the imaging unit; a touch panel provided on a display screen of the display unit for accepting an input corresponding to a contact position of an object from an outside; and a driving control unit for outputting, to the zoom driving unit, a driving signal for changing a zoom magnification of the zoom optical system by setting a middle point between contact positions on the touch panel corresponding to two position signals in response to an input of the different contact positions as a zoom center position fixed without depending on a zoom magnification of the zoom optical system when the two position signals are output from the touch panel.

A microscope system for driving each of electrically-driven units included in a microscope device to observe a sample according to an aspect of the present invention includes: a display unit for displaying an image corresponding to image data obtained by imaging an image of the sample and displaying operation information about a driving operation of each of the electrically-driven units; a touch panel provided on a display screen of the display unit for accepting an input corresponding to a contact position of an object from an outside; a storage unit for storing a position signal in response to an input of the contact position which is output from the touch panel; and a driving control unit for acquiring the position signal stored in the storage unit and outputting respective driving signals for driving the electrically-driven units to the electrically-driven units based on the position signal when the position signal is output from the touch panel and the output of the position signal is stopped.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 20 is a view typically explaining a summary of a pinch operation by a user.

DETAILED DESCRIPTION OF THE PREFERRED EMBODIMENTS

Figure 1:
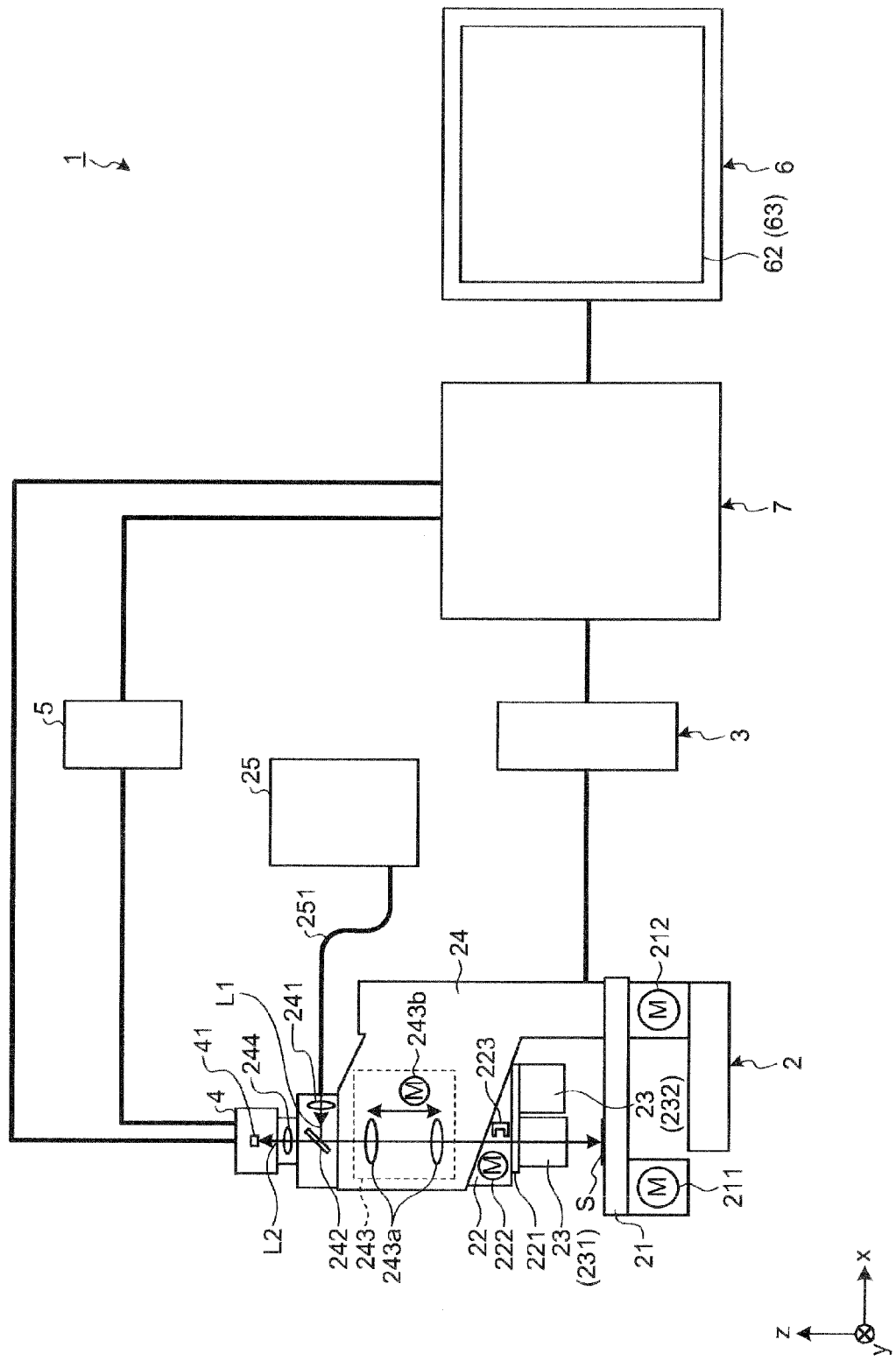
FIG. 1 is a conceptual diagram illustrating an example of a structure of a microscope system according to a first embodiment of the present invention.

Embodiments for carrying out the present invention (which will be hereinafter referred to as "embodiments") will be described below with reference to the drawings. The present invention is not limited to the embodiments which will be described below. In the description of the drawings, the same portions have the same reference numerals to give explanation.

First Embodiment

Figure 2:
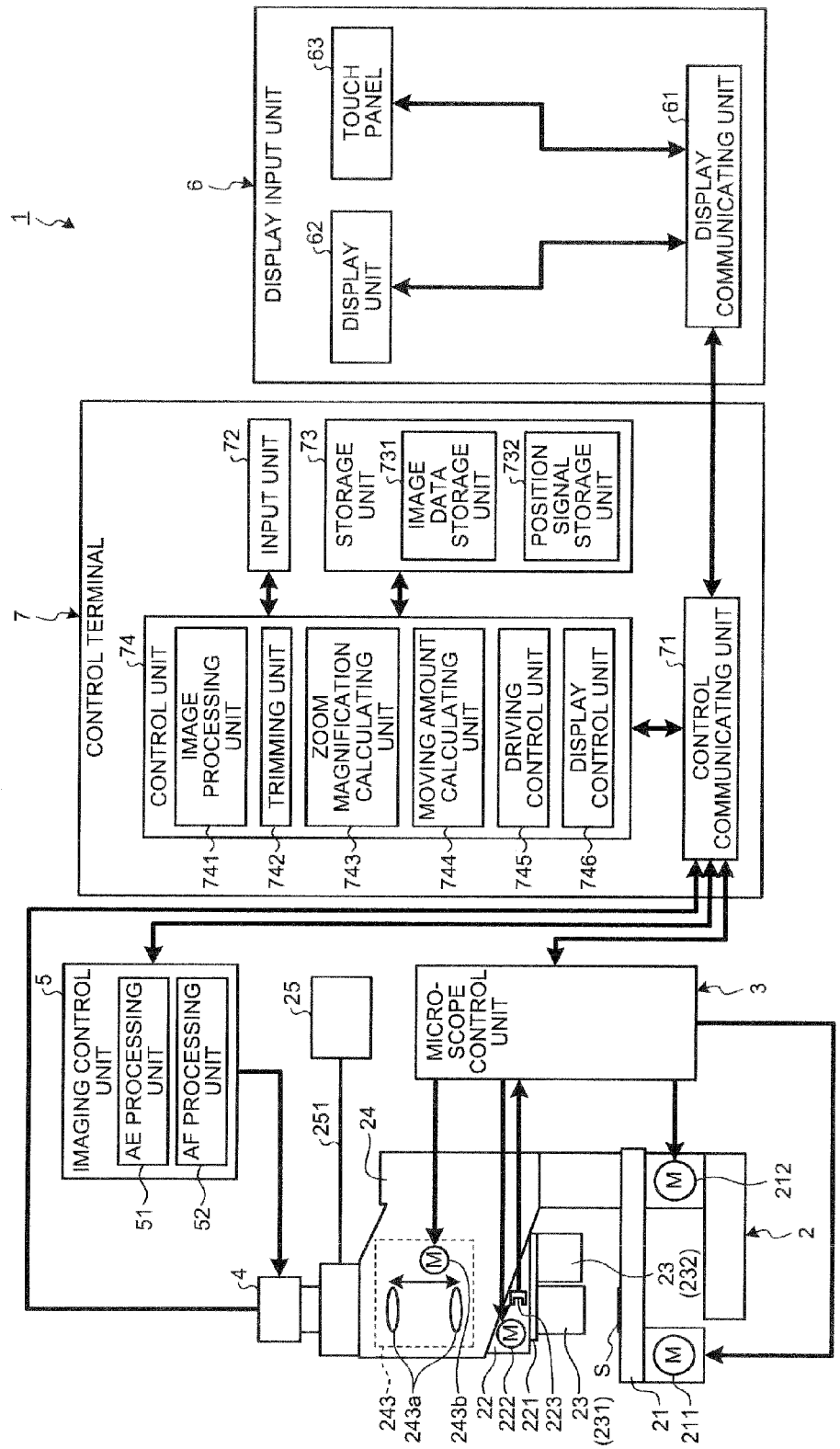
FIG. 2 is a block diagram illustrating a functional structure of the microscope system according to the first embodiment of the present invention.

FIG. 1 is a conceptual diagram illustrating an example of a structure of a microscope system according to a first embodiment of the present invention. FIG. 2 is a block diagram illustrating a functional structure of the microscope system according to the first embodiment of the present invention. In FIGS. 1 and 2, description will be given on the assumption that a plane on which a microscope system 1 is to be mounted is set to be an XY plane and a perpendicular direction to the XY plane is set to be a Z direction.

As illustrated in FIGS. 1 and 2, the microscope system 1 includes a microscope device 2 for observing a sample S, a microscope control unit 3 for controlling a driving operation of the microscope device 2, an imaging device 4 for imaging an image of the sample S through the microscope device 2, thereby generating image data, an imaging control unit 5 for controlling a driving operation of the imaging device 4, a display input unit 6 for displaying an image corresponding to the image data imaged by the imaging device 4 through a control terminal 7 and accepting an input of various operations of the microscope system 1, and the control terminal 7 for controlling the microscope control unit 3, the imaging control unit 5 and the display input unit 6. The microscope device 2, the microscope control unit 3, the imaging device 4, the imaging control unit 5, the display input unit 6 and the control terminal 7 are connected by cable or wirelessly so as to enable a transmission/reception of data.

The microscope device 2 includes an electrically-driven stage 21 on which the sample S is to be mounted, a microscope body unit 24 which takes substantially a C shape seen on a side surface, supports the electrically-driven stage 21 and holds an objective lens 23 through a revolver 22, and an incident-light illumination light source 25 for irradiating a light on the sample S.

The electrically-driven stage 21 is configured to be movable in X, Y and Z directions. The electrically-driven stage 21 is movable in the XY plane by means of a motor 211. The electrically-driven stage 21 detects a predetermined origin position in the XY plane by means of an origin sensor in an XY position, which is not illustrated, under control of the microscope control unit 3 and moves an observation place over the sample S by the control of a driving amount of the motor 211 with the origin position set to be a starting point. The electrically-driven stage 21 outputs, to the microscope control unit 3, a position signal (XY coordinates) related to the X and Y positions in an observation. Moreover, the electrically-driven stage 21 is movable in the Z direction by means of a motor 212. The electrically-driven stage 21 detects a predetermined origin position in the Z direction of the electrically-driven stage 21 by means of an origin sensor in a Z position, which is not illustrated, under the control of the microscope control unit 3, and focusing moves the sample S to an optional Z position within a predetermined height range by the control of the driving amount of the motor 212 with the origin position set to be a starting point. The electrically-driven stage 21 outputs, to the microscope control unit 3, a position signal related to the Z position in the observation.

The revolver 22 is provided slidably or rotatably with respect to the microscope body unit 24, and the objective lens 23 is disposed above the sample S. The revolver 22 is configured by using a nosepiece, a swing revolver or the like. The revolver 22 holds the objective lenses 23 having different magnifications (observation magnifications) by a mounter 221. In order to insert the revolver 22 onto an optical path for an observation light to alternatively switch the objective lens 23 to be used for observing the sample S, it has a revolver driving unit 222 for slidably moving or rotating the mounter 221 and a revolver detecting unit 223 for detecting a connection state of the revolver 22 or the like.

The revolver driving unit 222 slidably moves or rotates the mounter 221 under the control of the microscope control unit 3. The revolver detecting unit 223 has a revolver connecting sensor (not illustrated) for detecting that the revolver 22 is connected to the microscope body unit 24, a revolver sensor (not illustrated) for identifying a type of the objective lens 23 inserted onto the optical path for the observation light, and a movement completing sensor (not illustrated) for detecting that the objective lens 23 is inserted onto the optical path for the observation light. The revolver detecting unit 223 outputs, to the microscope control unit 3, results of the detection obtained by the various sensors.

The objective lens 23 has at least an objective lens 231 (hereinafter referred to as a "low power objective lens 231") and an objective lens 232 (hereinafter referred to as a "high power objective lens 232") each attached to the mounter 221. For example, the low power objective lens 231 has a comparative low magnification of one, two and four times, and the high power objective lens 232 has a magnification of 10, 20 and 40 times which is higher than the magnification of the low power objective lens 231. The magnifications of the low power objective lens 231 and the high power objective lens 232 are illustrative and it is sufficient that the magnification of the high power objective lens 232 is higher than that of the low power objective lens 231.

The microscope body unit 24 includes an illumination lens 241 for collecting an illumination light L1 emitted from the incident-light illumination light source 25 (which will be hereinafter referred to as an "incident-light illumination L1") through a fiber 251, a half mirror 242 for deflecting an optical path for the incident-light illumination L1 along an optical path of the objective lens 23, a zoom lens unit 243 for enlarging the sample S, and a imaging lens 244 for collecting a light reflected by the sample S which is incident through the objective lens 23, the zoom lens unit 243 and the half mirror 242 and forming an observation image.

The zoom lens unit 243 is configured by at least one lens, and has a zoom optical system 243a capable of zooming the sample S and a zoom driving unit 243b for driving the zoom optical system 243a along the optical axis. The zoom driving unit 243b moves the zoom optical system 243a along the optical axis under the control of the microscope control unit 3, thereby changing the zoom magnification of the zoom optical system 243a from one to 30 times, for example.

The incident-light illumination L1 is irradiated on the sample S via the illumination lens 241, the half mirror 242, the zoom optical system 243a and the objective lens 23. A reflected light L2 reflected by the sample S (which will be hereinafter referred to as an "observation light L2") is incident on the imaging device 4 via the objective lens 23, the zoom optical system 243a, the half mirror 242 and the imaging lens 244.

The incident-light illumination light source 25 is configured by a halogen lamp, a xenon lamp, an LED (Light emitting Diode) or the like. The incident-light illumination light source 25 emits, to the microscope body unit 24, the incident-light illumination L1 for forming an observation image of the sample S through the fiber 251.

The microscope control unit 3 is configured by using a CPU (Central Processing Unit) or the like and integrally controls an operation of each unit constituting the microscope device 2 under control of the control terminal 7. More specifically, the microscope control unit 3 executes a switch processing for driving the revolver driving unit 222, thereby rotating the mounter 221 to switch the objective lens 23 disposed on the optical path for the observation light L2, a processing for driving the motor 211 or the motor 212, thereby driving the electrically-driven stage 21, a regulation processing for regulating each unit of the microscope device 2 with the observation of the sample S, and the like. Moreover, the microscope control unit 3 outputs, to the control terminal 7, a state of each unit constituting the microscope device 2, for example, position information (the XY position or the Z position) about the electrically-driven stage 21, type information about the objective lens 23 attached to the revolver 22 and the like.

The imaging device 4 is configured by using an imaging element 41 such as a CCD (Charge Coupled Device) or a CMOS (Complementary Metal Oxide Semiconductor). The imaging device 4 images the observation image of the sample S which is incident via the imaging lens 244 under control of the imaging control unit 5 and outputs image data on the sample S which is imaged through a camera cable to the control terminal 7.

The imaging control unit 5 is configured by using a CPU or the like and controls the operation of the imaging device 4. More specifically, the imaging control unit 5 executes an automatic gain control ON/OFF switch processing of the imaging device 4, a gain set processing, a frame rate set processing and the like, thereby controlling the imaging operation of the imaging device 4. The imaging control unit 5 has an AE processing unit 51 and an AF processing unit 52.

The AE processing unit 51 automatically sets an exposing condition of the imaging device 4 based on the image data generated by the imaging device 4. More specifically, the AE processing unit 51 executes an AE processing for calculating a luminance from image data acquired through the control terminal 7 and determining the exposing condition of the imaging device 4, for example, an exposure time based on the luminance thus calculated, thereby adjusting the imaging device 4 automatically.

The AF processing unit 52 automatically regulates focus of the imaging device 4 based on the image data generated by the imaging device 4. More specifically, the AF processing unit 52 executes an AF processing for evaluating a contrast included in the image data and detecting a focusing position (a focal position), thereby regulating the focus of the imaging device 4 automatically. The AF processing unit 52 may detect the focal position (Z position) which is focused by evaluating the contrast of an image in each Z position of the electrically-driven stage 21 based on the image data.

The display input unit 6 has a display communicating unit 61 for communicating with the control terminal 7, a display unit 62 for displaying an image, and a touch panel 63 for outputting a position signal corresponding to a contact of an object from an outside.

The display communicating unit 61 is a communication interface for communicating with the control terminal 7. The display communicating unit 61 outputs image data output from the control terminal 7 to the display unit 62.

The display unit 62 is configured by using a display panel formed by a liquid crystal, an organic EL (Electro Luminescence) or the like. The display unit 62 displays an image corresponding to the image data input through the display communicating unit 61. The display unit 62 displays various operation information or the like of the microscope system 1.

Figure 3:
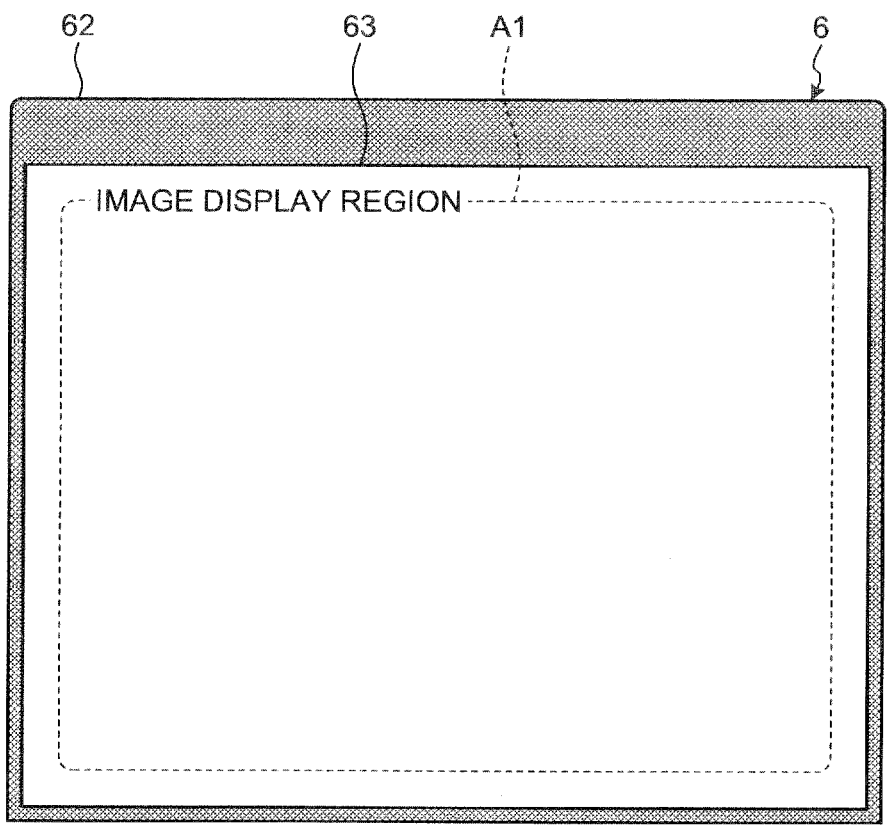
FIG. 3 is a view illustrating an example of a display input unit of the microscope system according to the first embodiment of the present invention.

The touch panel 63 is provided on a display screen of the display unit 62 and accepts an input corresponding to a contact position of the object from the outside. More specifically, the touch panel 63 detects a position in which a user makes a touch in accordance with an operation icon displayed on the display unit 62, and outputs a position signal corresponding to the touch position thus detected to the control terminal 7. For example, as illustrated in FIG. 3, the touch panel 63 functions as a graphical user interface (GUI) by causing the display unit 62 to display various operation information of the microscope system 1 within an image display region A1. In general, the touch panel includes a resistive film method, an electrostatic capacity method, an optical method and the like. In the first embodiment, a touch panel using any method can be applied. Moreover, the touch panel 63 detects, as the touch position, a center of gravity of a region including the position touched by the user.

The control terminal 7 includes a control communicating unit 71 for communicating with the microscope control unit 3, the imaging control unit 5 and the display input unit 6, a storage unit 73 for storing various information of the microscope system 1, an input unit 72 for accepting an input of a drive designating signal for designating to drive each unit of the microscope system 1, and a control unit 74 for controlling each unit of the microscope system 1.

The control communicating unit 71 is a communication interface for communicating with each of the microscope control unit 3, the imaging control unit 5 and the display input unit 6, respectively. Moreover, the control communicating unit 71 outputs image data output from the imaging device 4 through the camera cable to the control unit 74.

The input unit 72 is configured by using a keyboard, a mouse, a joy stick, various switches and the like, and outputs an operation signal corresponding to an operation input of the various switches to the control unit 74.

The storage unit 73 is implemented by using a semiconductor memory, for example, a flash memory, an RAM (Random Access Memory) and the like which are fixedly provided in the control terminal 7. The storage unit 73 stores various programs to be executed by the microscope system 1 and various data to be used during the execution of the programs. Moreover, the storage unit 73 temporarily stores information in the processing of the control unit 74. The storage unit 73 has an image data storage unit 731 for storing the image data imaged by the imaging device 4 and a position signal storage unit 732 for storing a position signal indicative of a contact position input from the touch panel 63 of the display input unit 6. The storage unit 73 may be configured by using a memory card attached from an outside, or the like.

The control unit 74 is configured by using a CPU or the like, and carries out an instruction corresponding to each unit constituting the microscope system 1 or transfers data in response to a drive designating signal, a position signal, a switching signal and the like which are sent from the input unit 72 and the touch panel 63, thereby controlling the operation of the microscope system 1 integrally.

The detailed structure of the control unit 74 will be described. The control unit 74 has an image processing unit 741, a trimming unit 742, a zoom magnification calculating unit 743, a moving amount calculating unit 744, a driving control unit 745, and a display control unit 746.

The image processing unit 741 carries out a predetermined image processing over the image data input through the control communicating unit 71, thereby generating a display image to be displayed by the display unit 62. More specifically, the image processing unit 741 executes an image processing including an optical black subtraction processing, a white balance adjustment processing, a synchronization processing, a color matrix calculation processing, a γ correction processing, a color reproduction processing, an edge enhancement processing and the like over the image data. The image processing unit 741 compresses the image data by a predetermined method, for example, the JPEG (Joint Photographic Experts Group) method and outputs the compressed image data to the image data storage unit 731.

The trimming unit 742 cuts a predetermined region out of an image corresponding to the image data subjected to the image processing by the image processing unit 741, thereby generating a trimming image.

The zoom magnification calculating unit 743 calculates a zoom magnification of the zoom lens unit 243 based on two position signals output from the touch panel 63. More specifically, the zoom magnification calculating unit 743 calculates a zoom magnification of the zoom optical system 243a based on a ratio of lengths before and after a change in a distance of the contact position on the touch panel 63 corresponding to the two position signals output from the touch panel 63 and the zoom magnification of the zoom optical system 243a immediately after the change starts. The zoom magnification calculating unit 743 may utilize a correction coefficient and weighting depending on the distance of the contact position.

The moving amount calculating unit 744 calculates a moving amount and a position for driving the electrically-driven stage 21 in a position in which a zoom center position fixed without depending on the zoom magnification of the zoom optical system 243a is displayed in almost the same display position over an image displayed by the display unit 62 before and after the zoom of the zoom optical system 243a based on the two position signals output from the touch panel 63.

In the case in which the two position signals depending on the input of different contact positions are output from the touch panel 63, the driving control unit 745 outputs, to the zoom driving unit 243b, a driving signal for setting a middle point of the contact position on the touch panel 63 corresponding to the two position signals as a zoom center position fixed without depending on the zoom magnification of the zoom optical system 243a, thereby changing the zoom magnification of the zoom optical system 243a. The driving control unit 745 outputs a driving signal depending on the zoom magnification calculated by the zoom magnification calculating unit 743 to the zoom driving unit 243b. Moreover, the driving control unit 745 outputs a driving signal for driving the electrically-driven stage 21 in a position in which the zoom center position of the zoom optical system 243a is displayed in almost the same display position over an image displayed by the display unit 62 before and after the change in the zoom through the zoom optical system 243a to the motor 211. More specifically, the driving control unit 745 outputs a driving signal depending on the moving amount for moving the electrically-driven stage 21 which is calculated by the moving amount calculating unit 744 to the motor 211.

The display control unit 746 controls a display mode of the display unit 62. More specifically, the display control unit 746 causes the display unit 62 to display each image of image data stored in the image data storage unit 731. The display control unit 746 causes the display unit 62 to display operation information about each operation of the microscope system 1, for example, operation information of the electrically-driven stage 21 or the like.

The microscope system 1 thus configured can cause a user to observe an image of the sample S by displaying the image data of the sample S, which is imaged by the imaging device, 4 on the display unit 62 under the control of the control unit 74. In the microscope system 1, furthermore, the control unit 74 outputs a designating signal or a driving signal to each unit of the microscope system 1 based on the position signal input from the touch panel 63, thereby driving the microscope device 2 and the imaging device 4.

Figure 4:
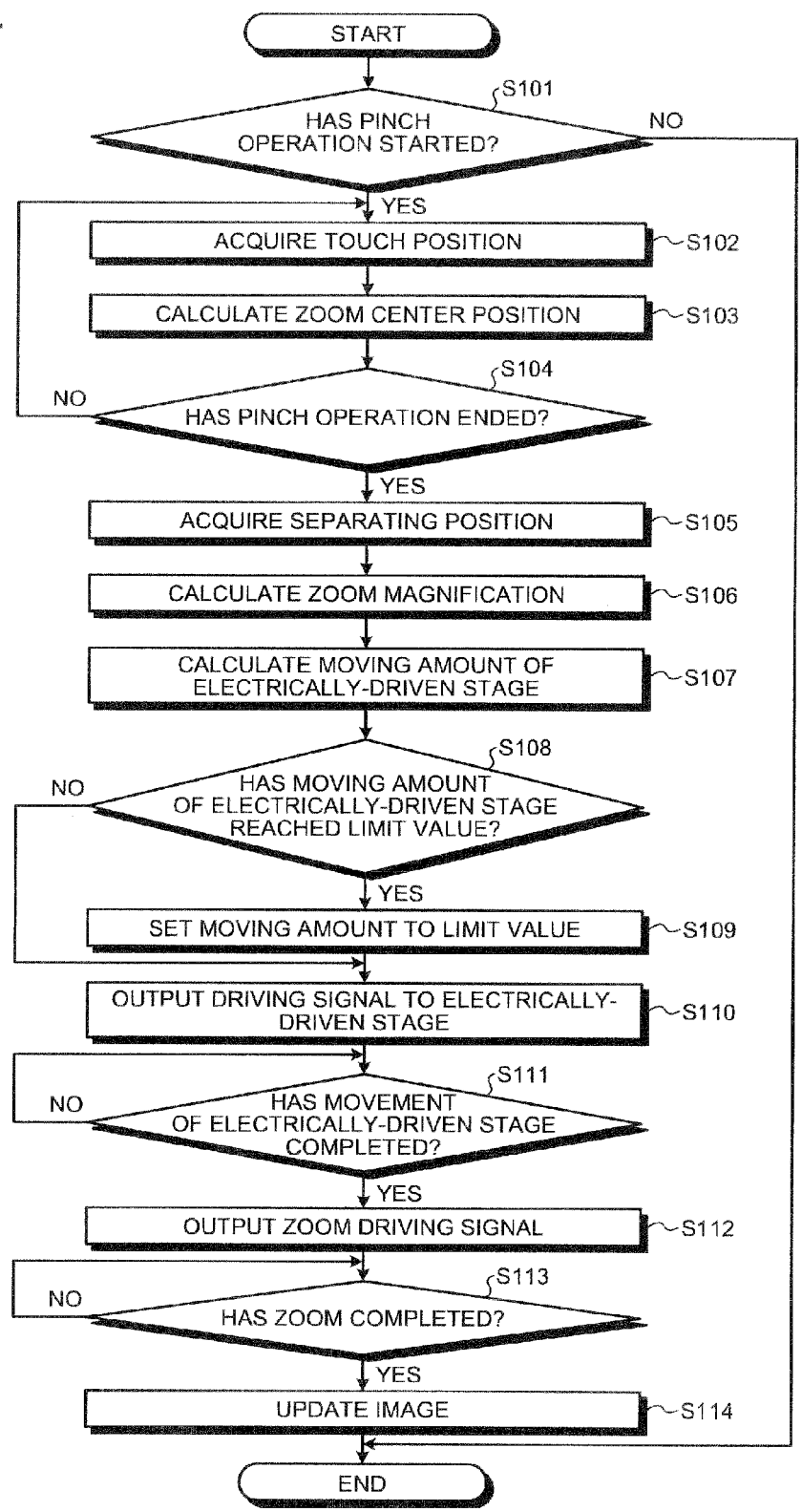
FIG. 4 is a flow chart illustrating a summary of a processing to be executed by the microscope system according to the first embodiment of the present invention.

Next, an operation to be carried out by the microscope system 1 will be descried. FIG. 4 is a flow chart illustrating a summary of the processing to be carried out by the microscope system 1 according to the first embodiment. In the following, description will be given by taking the electrically-driven stage 21 and the zoom lens unit 243 as an example of an electrically-driven unit of the microscope device 2.

Figure 5:
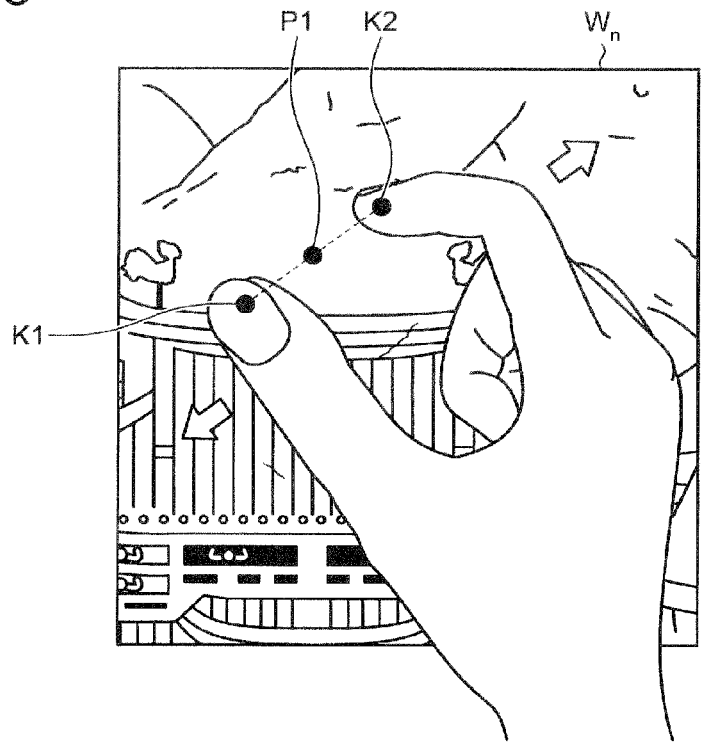
FIG. 5 is a view typically illustrating a start of a pinch operation.

As illustrated in FIG. 4, the driving control unit 745 determines whether a pinch operation is started over the touch panel 63 or not (Step S101). More specifically, as illustrated in FIG. 5, the driving control unit 745 determines whether or not a user touches two different places (K1, K2) over the touch panel 63 so that two position signals depending on an input of the different contact positions is output from the touch panel 63. If the driving control unit 745 determines that the pinch operation is started over the touch panel 63 (Step S101: Yes), the microscope system 1 makes a transition to Step S102. On the other hand, if the driving control unit 745 determines that the pinch operation is not started through the touch panel 63 (Step S101: No), the microscope system 1 ends the present processing.

Subsequently, the driving control unit 745 acquires touch positions K1 and K2 corresponding to the two position signals output from the touch panel 63 (Step S102) and calculates the zoom center position of the zoom optical system 243a (Step S103). More specifically, as illustrated in FIG. 5, the driving control unit 745 calculates, as the zoom center position of the zoom optical system 243a, a middle point P1 of a straight line connecting the two touch positions K1 and K2 at which the user first touches the touch panel 63.

Then, the driving control unit 745 determines whether the pinch operation is ended over the touch panel 63 or not (Step S104). More specifically, the driving control unit 745 determines whether the output of at least one of the position signals from the touch panel 63 is stopped or not, thereby deciding whether the pinch operation is ended or not. If the driving control unit 745 determines that the pinch operation is ended over the touch panel 63 (Step S104: Yes), the microscope system 1 makes a transition to Step S105. On the other hand, if the driving control unit 745 determines that the pinch operation is not ended over the touch panel 63 (Step S104: No), the microscope system 1 returns to the Step S102.

Figure 6:
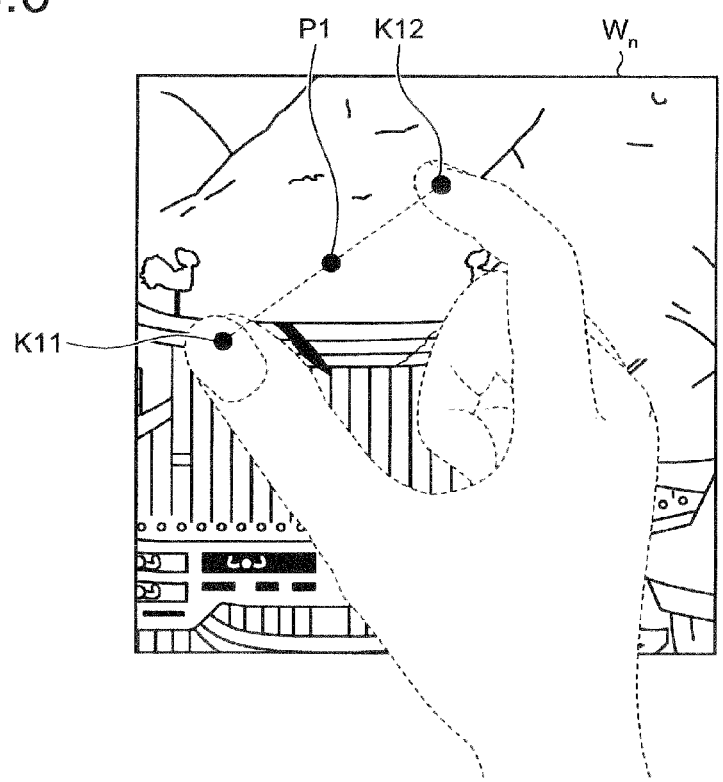
FIG. 6 is a view typically illustrating an end of the pinch operation.

Subsequently, the driving control unit 745 acquires a separating position at which the user separates from the touch panel 63 (Step S105). More specifically, as illustrated in FIG. 6, the driving control unit 745 acquires separating positions K11 and K12 in response to the position signal output from the touch panel 63 when the user separates from the touch panel 63. Although the description has been given by taking, as an example of the pinch operation, a pinch-out operation for enlarging the sample S in FIGS. 5 and 6, it is also possible to carry out a pinch-in operation for reducing the sample S. Herein, the pinch-out operation represents that a distance between two touch positions at which the user touches the touch panel 63 in different positions is to be increased toward an outer edge of the touch panel 63 with time. Also, the pinch-in operation represents that the two touch positions at which the user touches the touch panel 63 in the different positions are to be reduced with time.

Thereafter, the zoom magnification calculating unit 743 calculates the zoom magnification of the zoom lens unit 243 (Step S106). More specifically, the zoom magnification calculating unit 743 calculates a zoom magnification Z in accordance with the following equation when a condition of R≥1.0 is satisfied, wherein a ratio of a straight line connecting the two touch positions K1 and K2 at a start of the pinch operation over the touch panel 63 by the user to a straight line connecting the two separating positions K11 and K12 at an end of the pinch operation is represented by R, an ROI zoom correction coefficient in the zoom of a region of interest including a zoom center position (which will be hereinafter referred to as (ROI)) is represented by C and a current zoom magnification is represented by N.

$$Z=(R\times C+(1-C))\times N \quad (1)$$

When a condition of R<1.0 is satisfied, the zoom magnification calculating unit 743 calculates the zoom magnification Z in accordance with the following equation.

$$Z=(1\div(((1\div R)\times C)+(1-C)))\times N \quad (2)$$

Thus, the zoom magnification calculating unit 743 calculates the zoom magnification of the zoom optical system 243a based on the ratio of the lengths before and after the change in the distance between the two contact positions, the ROI zoom correction coefficient and the current zoom magnification by using the equations (1) and (2). The ROI correction coefficient can be previously calculated from a simulation and properly set. In the first embodiment, the ROI correction coefficient is set to be 0.5. Consequently, the user can stepwise carry out a change from a minimum zoom magnification to a maximum zoom magnification by three to four pinch operations when the ratio before and after the pinch operation is approximately 4 to 5 (×1.0→×3.0→×9.0→×27.0→×30.0). The zoom magnification may be equal (×1.0→×10.0→×20.0→×30.0).

Subsequently, the moving amount calculating unit 744 calculates a moving amount by which the electrically-driven stage 21 is to be moved based on the point P1 between the two touch positions K1 and K2 in the pinch operation (Step S107). More specifically, the driving control unit 745 calculates the moving amount of the electrically-driven stage 21 to a position in which the display position of the middle point P1 between the two touch positions K1 and K2 through the pinch operation is fixed in an image $W_n$ (n is a natural number) which is displayed by the display unit 62.

Then, the driving control unit 745 determines whether or not the moving amount of the electrically-driven stage 21, which is calculated by the moving amount calculating unit 744, is equal to or greater than a limit value of the moving amount of the electrically-driven stage 21 (Step S108). If the driving control unit 745 determines that the moving amount of the electrically-driven stage 21, which is calculated by the moving amount calculating unit 744, is equal to or greater than the limit value of the moving amount of the electrically-driven stage 21 (Step S108: Yes), the driving control unit 745 sets the moving amount of the electrically-driven stage 21 to the limit value (Step S109). Thereafter, the microscope system 1 makes a transition to the Step S110. On the other hand, if the driving control unit 745 determines that the moving amount of the electrically-driven stage 21, which is calculated by the moving amount calculating unit 744, does not reach the limit value of the moving amount of the electrically-driven stage 21 (Step S108: No), the microscope system 1 makes a transition to the Step S110.

Subsequently, the driving control unit 745 outputs a driving signal corresponding to the moving amount of the electrically-driven stage 21, which is calculated by the moving amount calculating unit 744, to the microscope control unit 3 (Step S110). In this case, the microscope control unit 3 moves the electrically-driven stage 21 by driving the motor 211 based on the driving signal input from the driving control unit 745.

Next, the driving control unit 745 determines whether the movement of the electrically-driven stage 21 is completed or not (Step S111). More specifically, the driving control unit 745 determines whether or not a movement completing signal indicative of a completion of a movement of the electrically-driven stage 21 is input from the microscope control unit 3. If the driving control unit 745 determines that the movement of the electrically-driven stage 21 is completed (Step S111: Yes), the microscope system 1 makes a transition to Step S112. On the other hand, if the driving control unit 745 determines that the movement of the electrically-driven stage 21 is not completed (Step S111: No), the driving control unit 745 makes the determination every predetermined interval (for example, one pulse).

Then, the driving control unit 745 outputs a zoom drive designating signal corresponding to the zoom magnification calculated by the zoom magnification calculating unit 743 to the microscope control unit 3 (Step S112). In this case, the microscope control unit 3 drives the zoom driving unit 243b based on the zoom drive designating signal input from the driving control unit 745, thereby moving the zoom optical system 243a along an optical axis to change the zoom magnification of the microscope device 2. The microscope control unit 3 may change the optical zoom of the zoom lens unit 243 to be a maximum and output a digital zoom designating signal for designating a digital zoom through the trimming unit 742 to the control terminal 7 if the zoom drive designating signal input from the driving control unit 745 exceeds an upper limit of the optical zoom magnification of the optical zoom in the zoom optical system 243a.

Thereafter, the driving control unit 745 determines whether the zoom of the zoom optical system 243a is completed or not (step S113). More specifically, the driving control unit 745 determines whether a zoom completing signal indicative of a zoom completion of the zoom optical system 243a is input from the microscope control unit 3 or not. If the driving control unit 745 determines that the zoom driving of the zoom optical system 243a is completed (Step S113: Yes), the microscope system 1 makes a transition to Step S114. On the other hand, if the driving control unit 745 determines that the zoom driving of the zoom optical system 243a is not completed (Step S113: No), the driving control unit 745 makes the determination every predetermined interval (for example, one pulse).

Figure 7:
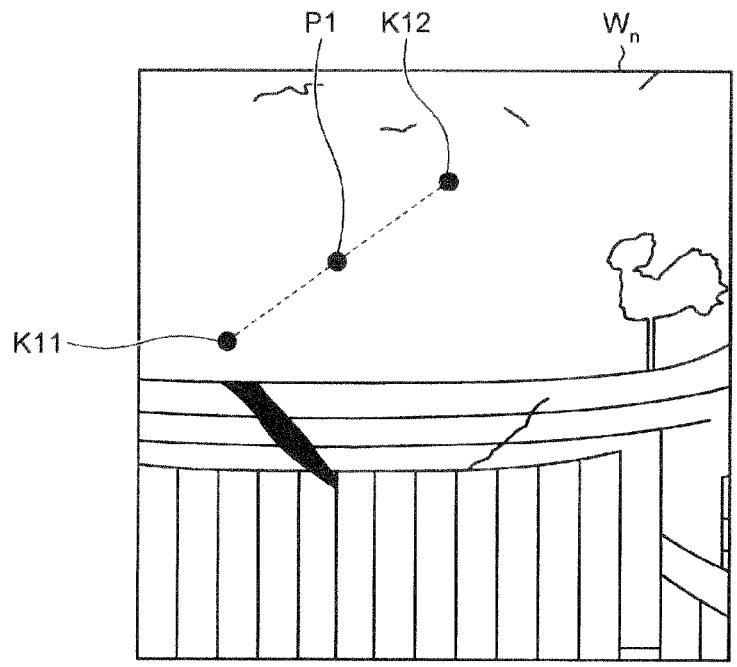
FIG. 7 is a view illustrating an example of an image to be displayed by a display unit of the microscope system according to the first embodiment of the present invention.

Subsequently, the driving control unit 745 outputs a photograph designating signal to the imaging control unit 5, thereby causing the imaging device 4 to image an image of the sample S after driving the electrically-driven stage 21 and the zoom optical system 243a and thus generating image data to update the image displayed by the display unit 62 into an image after driving the electrically-driven stage 21 and the zoom optical system 243a (Step S114). More specifically, as illustrated in FIG. 7, the zoom center position (the middle point P1) obtained by the zoom optical system 243a is rarely moved before and after the pinch operation (the zoom operation) in the display position in the image $W_n$ displayed by the display unit 62. As a result, it is possible to carry out an observation with an enlargement or a reduction without changing a desirable observation place on the sample S by a single operation. After the Step S114, the microscope system 1 ends the present processing.

According to the first embodiment of the present invention described above, in the case in which position signals in response to the input of the different contact positions are output from the touch panel 63, the driving control unit 745 outputs, to the zoom driving unit 243b, a driving signal for designating to change the zoom magnification of the zoom optical system 243a by setting the middle point P1 between the two contact positions on the touch panel 63 corresponding to the two position signals as a zoom center position fixed without depending on the zoom magnification of the zoom optical system 243a. Consequently, the desirable observation position on the sample S can be enlarged or reduced by the single operation.

According to the first embodiment of the present invention, moreover, it is possible to change, by an intuitive operation, the observation position for enlarging and observing the sample S while seeing the live image $W_n$ displayed by the display unit 62.

According to the first embodiment of the present invention, furthermore, operation information (an icon) for accepting the operation of the microscope device 2 is not displayed on the live image $W_n$ displayed by the display unit 62. Therefore, it is possible to increase a space of the display region of the display unit 62, and furthermore, the live image $W_n$ to be displayed by the display unit 62 includes only the sample S. As a result, the user can intensively observe only the sample S.

According to the first embodiment of the present invention, moreover, the zoom magnification calculating unit 743 calculates the zoom magnification of the zoom optical system 243a based on the ratio of the lengths before and after the change in the distance between the two contact positions corresponding to the two position signals output from the touch panel 63 respectively and the zoom magnification of the zoom optical system 243a at the start of the change in the distance between the two contact positions. Also in a case in which a different user carries out the operation, therefore, it is possible to implement the same operability.

According to the first embodiment of the present invention, furthermore, a frame indicative of the ROI region is not displayed differently from the ROI zoom for the conventional ROI region. Therefore, it is possible to execute the zoom operation for the ROI at a small number of times of the operation. Similarly, the frame indicative of the ROI region is not displayed. For this reason, it is also possible to cope with a processing for reducing the ROI zoom.

According to the first embodiment of the present invention, moreover, the zoom center position obtained by the zoom lens unit 243 on the live image $W_n$ displayed by the display unit 62 is not moved before and after the zoom operation. Therefore, the user can prevent from losing sight of the observation position on the sample S.

According to the first embodiment of the present invention, furthermore, the driving control unit 745 outputs, to the zoom driving unit 243b, the driving signal corresponding to the zoom magnification calculated by the zoom magnification calculating unit 743. Even if the user does not often carry out the pinch operation, therefore, it is possible to change the zoom magnification of the zoom lens unit 243 to be a maximum or a minimum at a specified number of times. As a result, the user does not need to perform an extra pinch operation for ensuring the zoom magnification.

First Modified Example of First Embodiment

Although the driving control unit 745 drives the zoom lens unit 243 at the zoom magnification calculated based on the ratio of the straight line connecting the two touch positions in the starting position for the pinch operation to the straight line connecting the two separating positions at the end of the pinch operation in the first embodiment, the zoom magnification based on the single pinch operation may be limited, for example. In this case, the user may set the number of times of the pinch operations required for switching the zoom magnification from the maximum magnification to the minimum magnification of the zoom lens unit 243 through the input unit 72 or from the minimum magnification to the maximum magnification thereof. Consequently, it is possible to carry out the pinch operation to be matched with the user's taste.

Second Modified Example of First Embodiment

Figure 8:
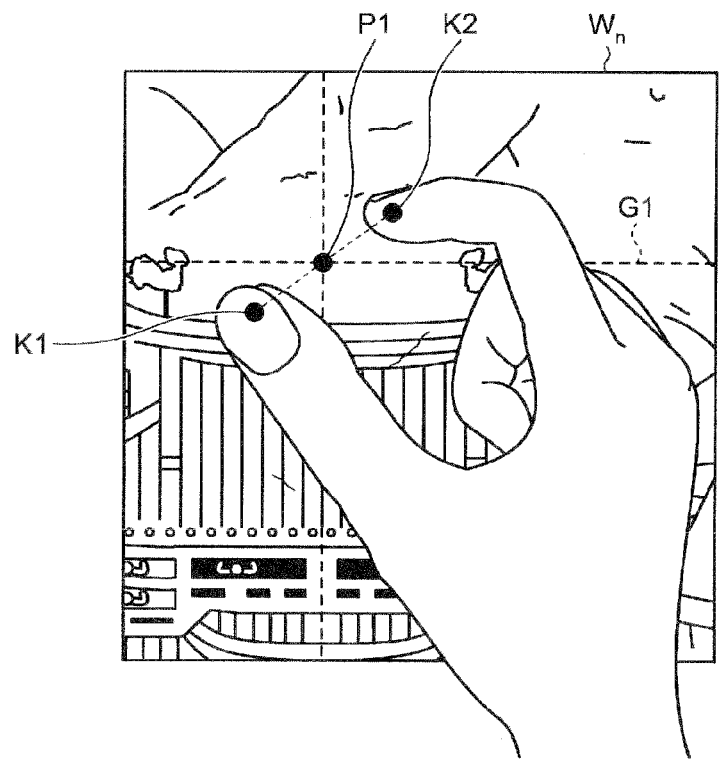
FIG. 8 is a view illustrating an example of an image to be displayed by a display unit of a microscope system according to a second modified example of the first embodiment in accordance with the present invention.

In the first embodiment, the zoom center position P1 of the zoom optical system 243a may be displayed on the display unit 62 in an identification enabling state. FIG. 8 is a view illustrating an example of an image to be displayed by the display unit 62 of the microscope system 1 according to the second modified example of the first embodiment.

As illustrated in FIG. 8, the display control unit 746 causes the display unit 62 to display cross lines G1 which are orthogonal to each other around the middle point P1 (the zoom center position) calculated by the driving control unit 745. Consequently, the user can carry out the pinch operation while confirming the zoom center position P1 of the zoom optical system 243a.

Although the display control unit 746 causes the display unit 62 to display the cross lines G1 in the zoom center position of the zoom optical system 243a in the second modified example of the first embodiment, the display unit 62 may be caused to display an icon such as a character or a graphic as information which can be identified.

Third Modified Example of First Embodiment

Figure 9:
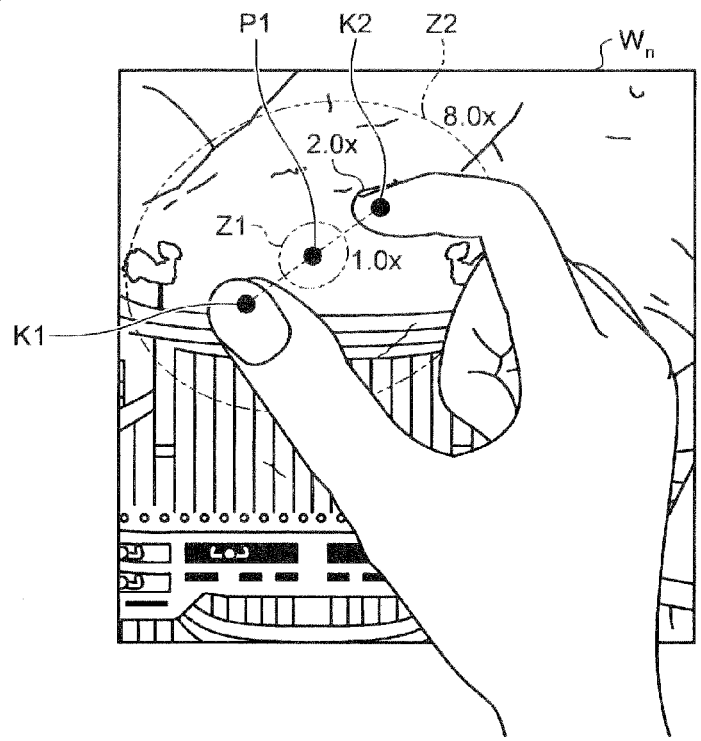
FIG. 9 is a view illustrating an example of an image to be displayed by a display unit of a microscope system according to a third modified example of the first embodiment in accordance with the present invention.

In the first embodiment, the display control unit 746 may cause the display unit 62 to display an ROI zoom region and an ROI region which correspond to an amount of the pinch operation so as to enable an identification. FIG. 9 is a view illustrating an example of an image to be displayed by the display unit 62 of the microscope system 1 according to a third modified example of the first embodiment.

As illustrated in FIG. 9, the display control unit 746 may cause the display unit 62 to display ROI zoom regions Z1 and Z2 corresponding to the operating amount of the pinch operation, a zoom magnification corresponding to the ROI zoom region and a current zoom magnification of the zoom optical system 243a in the pinch operation based on the position signal output from the touch panel 63. More specifically, the ROI zoom region Z1 indicates the operating amount of the pinch operation from the current zoom magnification (×2.0) of the zoom optical system 243a to a zoom magnification (×1.0) which can be reduced at the start of the pinch operation. The ROI zoom region Z2 indicates the operating amount of the pinch operation from the current zoom magnification (×2.0) of the zoom optical system 243a to a zoom magnification (×8.0) which can be increased at the start of the pinch operation.

According to the third modified example of the first embodiment, thus, the display control unit 746 causes the display unit 62 to display the operating amount of the pinch operation, the zoom magnification and the like in the pinch operation based on the position signal output from the touch panel 63. As a result, the user can intuitively grasp the ROI zoom region which can be enlarged by the pinch operation in real time, the ROI region which can be reduced and the current zoom magnification during the pinch operation.

Fourth Modified Example of First Embodiment

Figure 10:
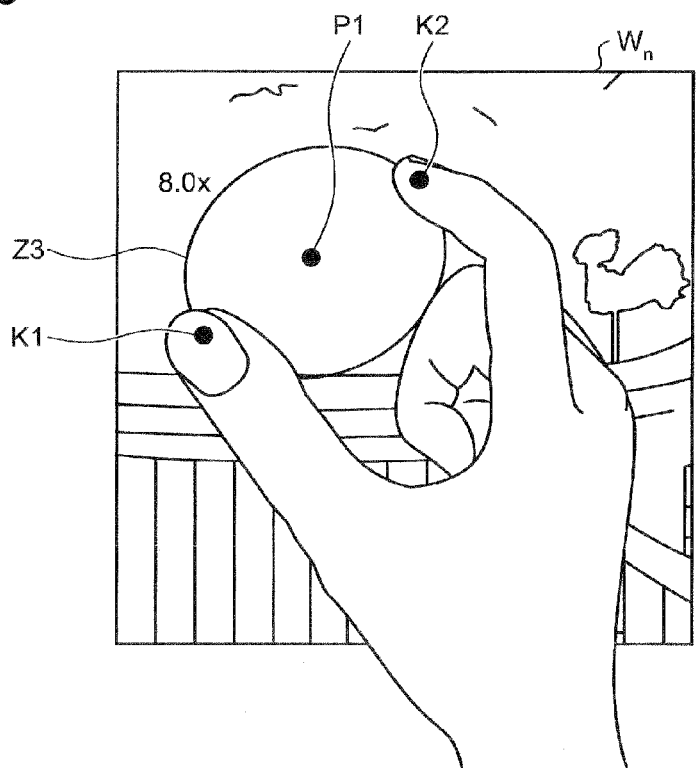
FIG. 10 is a view illustrating an example of an image to be displayed by a display unit of a microscope system according to a fourth modified example of the first embodiment in accordance with the present invention.

In the first embodiment, the display control unit 746 may display the zoom magnification of the zoom optical system 243a in superposition on an image which is being subjected to the pinch operation depending on the operating amount during the pinch operation based on the position signal output from the touch panel 63. FIG. 10 is a view illustrating an example of an image to be displayed by the display unit 62 of the microscope system 1 according to the fourth modified example of the first embodiment.

As illustrated in FIG. 10, the display control unit 746 causes the display unit 62 to display a zoom magnification Z3 of the zoom optical system 243a in superposition on an image $W_n$ which is being subjected to the pinch operation depending on the pinch operation.

According to the fourth modified example of the first embodiment, thus, the display control unit 746 displays the zoom magnification of the zoom optical system 243a in superposition on the image $W_n$ which is being subjected to the pinch operation depending on the operating amount of the pinch operation based on the position signal output from the touch panel 63. As a result, the user can intuitively grasp the zoom magnification of the zoom optical system 243a in real time while performing the pinch operation.

In the fourth modified example of the first embodiment, the display control unit 746 may cause the display unit 62 to display the position of the electrically-driven stage 21 corresponding to the zoom center position P1 of the zoom optical system 243a in schematic superposition on the image $W_n$ in the vicinity of a place in which the user performs the pinch operation based on the position signal output from the touch panel 63. Consequently, the user can intuitively grasp the zoom center position P1 of the zoom optical system 243a and the position of the electrically-driven stage 21.

Fifth Modified Example of First Embodiment

Although the driving control unit 745 controls the movement of the electrically-driven stage 21 so that the zoom center position P1 of the zoom optical system 243a is displayed in the same position on the image displayed by the display unit 62 before and after the pinch operation in the first embodiment, the electrically-driven stage 21 may be driven in such a manner that the zoom center position P1 of the zoom optical system 243a is placed at the center on the image displayed by the display unit 62, for example. Consequently, the zoom center position P1 is moved to the center of the image displayed by the display unit 62. As a result, the user can observe a desirable observation position in the sample S at the center of the display unit 62. Therefore, it is possible to reduce the number of times of the pinch operation.

Sixth Modified Example of First Embodiment

Figure 11:
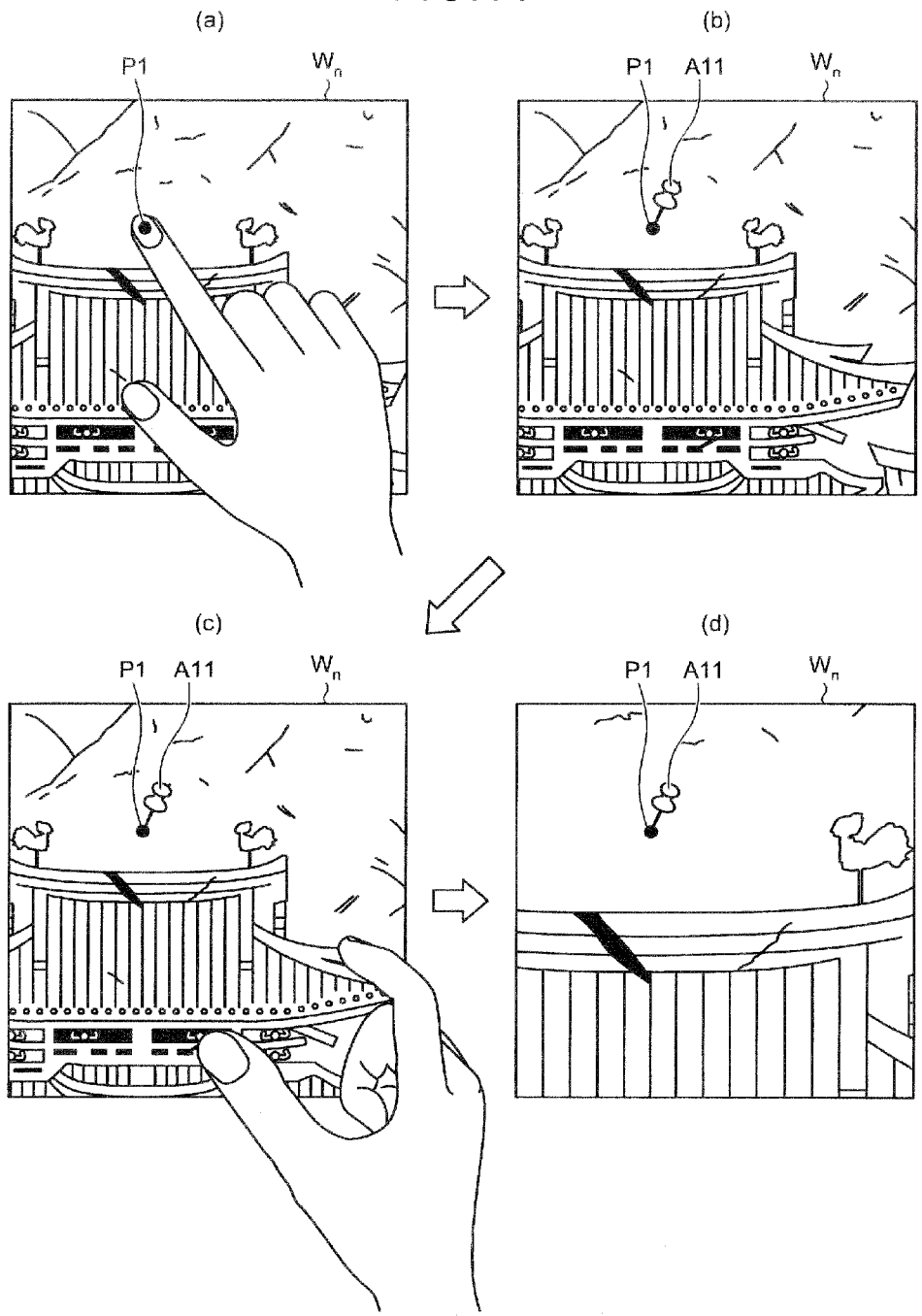
FIG. 11 is a view illustrating an example of an image to be displayed by a display unit of a microscope system according to a sixth modified example of the first embodiment in accordance with the present invention.

In the first embodiment, the zoom center position P1 of the zoom optical system 243a may be designated over the image displayed by the display unit 62 through the touch panel 63. FIG. 11 is a view illustrating an example of the image displayed by the display unit 62 of the microscope system 1 according to a sixth modified example of the first embodiment.

As illustrated in FIG. 11, the driving control unit 745 designates the zoom center position P1 of the zoom optical system 243a over the image $W_n$ displayed by the display unit 62 when the position signal input from the touch panel 63 indicates almost the same position of the touch panel 63 beyond a certain time (for example, two seconds) (FIG. 11(a)). In this case, the display control unit 746 causes the display unit 62 to display the zoom center position P1 of the zoom optical system 243a designated by the driving control unit 745 by information which can be identified, for example, with an icon such as a symbol, a character and a graphic. More specifically, as illustrated in FIG. 11(b), the display control unit 746 displays an icon A11 over the image $W_n$ corresponding to the zoom center position P1 of the zoom optical system 243a which is designated by the driving control unit 745.

When the pinch operation is carried out in any position over the touch panel 63 (FIG. 11(c)), then, the driving control unit 745 controls the movement of the electrically-driven stage 21 in such a manner that the zoom center position P1 of the zoom optical system 243a, which is designated, is set to be almost the same position over the image $W_n$ displayed by the display unit 62 (FIG. 11(d)).

According to the sixth modified example of the first embodiment, thus, the driving control unit 745 designates the zoom center position P1 of the zoom optical system 243a over the image $W_n$ displayed by the display unit 62 when the position signal input from the touch panel 63 indicates substantially the same position of the touch panel 63 beyond a certain time. Even if a user repetitively performs the pinch operation in any position on the touch panel 63, consequently, the zoom center position P1 of the zoom optical system 243a is fixed. Therefore, it is possible to observe almost the same observation position over the sample S with an enlargement or a reduction.

Seventh Modified Example of First Embodiment

Figure 12:
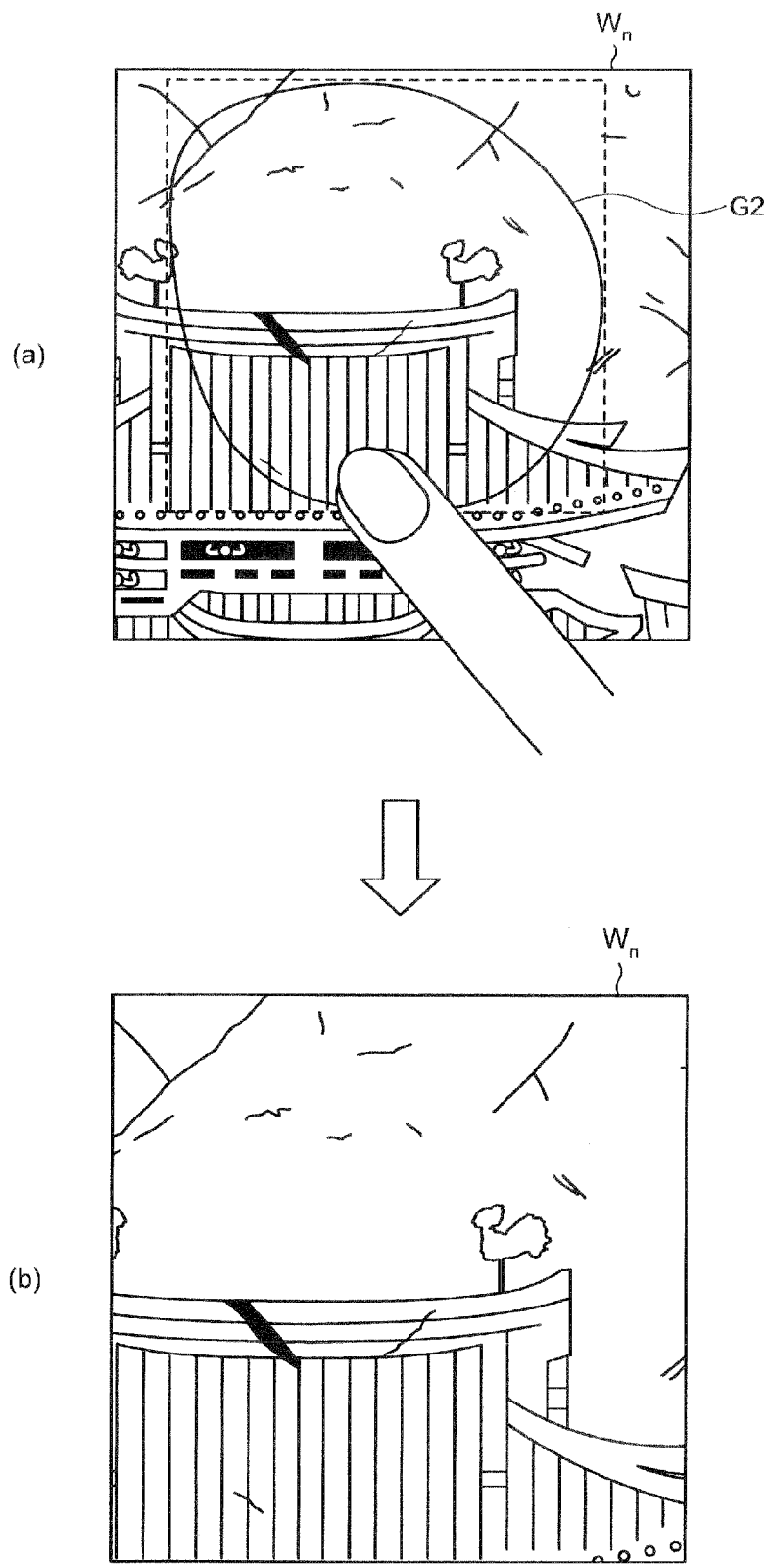
FIG. 12 is a view illustrating an example of an image to be displayed by a display unit of a microscope system according to a seventh modified example of the first embodiment in accordance with the present invention.

In the first embodiment, the driving control unit 745 may set the ROI zoom region of the zoom optical system 243a depending on a track of the position signal input from the touch panel 63. FIG. 12 is a view illustrating an example of an image displayed by the display unit 62 of the microscope system 1 according to a seventh modified example of the first embodiment.

As illustrated in FIG. 12, the driving control unit 745 sets the ROI zoom region of the zoom optical system 243a depending on the track G2 touched by the user over the touch panel 63 (see FIG. 12(a)). More specifically, the driving control unit 745 sets, as the ROI zoom region, a rectangular region including XY coordinates of a maximum value and a minimum value in a touch position corresponding to the position signal input from the touch panel 63 (see FIG. 12(a)).

Then, the driving control unit 745 drives the electrically-driven stage 21 and the zoom driving unit 243b, thereby displaying the rectangular region in the display region of the display unit 62 in order to display the whole rectangular region in the whole display region of the display unit 62 (see FIG. 12(b)).

According to the seventh modified example of the first embodiment, thus, the driving control unit 745 sets the ROI zoom region of the zoom optical system 243a depending on the track G2 of the position signal input from the touch panel 63. Consequently, the user can enlarge and observe a desirable observation position on the sample S by simply touching the image $W_n$ displayed by the display unit 62 through the touch panel 63 continuously.

Eighth Modified Example of First Embodiment

Although the electrically-driven stage 21 can be moved in a horizontal direction under the control of the driving control unit 745 in the first embodiment, the present invention can also be applied to a manual stage to be manually moved by the user. More specifically, the driving control unit 745 changes only the zoom magnification of the zoom lens unit 243 according to the pinch operation. Consequently, the user can change the zoom magnification by the pinch operation also in the manual stage.

Second Embodiment

Next, a second embodiment according to the present invention will be described. A microscope system according to the second embodiment of the present invention is different from the microscope system according to the embodiment described above in respect of only an operation thereof, and has the same structure as that of the microscope system according to the embodiment described above. For this reason, description will be given to the operation to be carried out by the microscope system according to the second embodiment.

Figure 13:
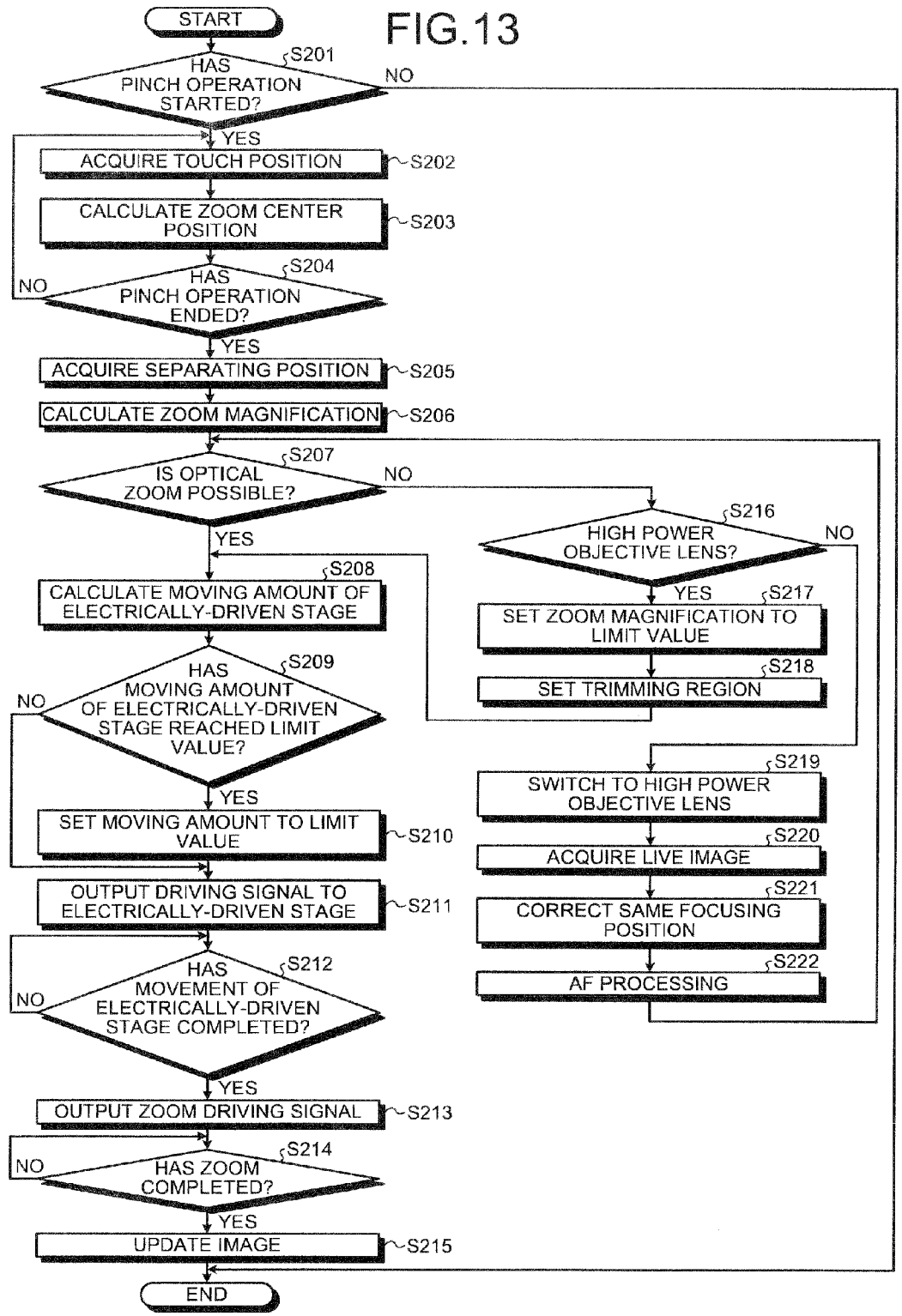
FIG. 13 is a flow chart illustrating a summary of a processing to be executed by a microscope system according to a second embodiment of the present invention.

FIG. 13 is a flow chart illustrating a summary of a processing to be executed by the microscope system 1 according to the second embodiment.

As illustrated in FIG. 13, Steps S201 to S206 correspond to the Steps S101 to S106 in FIG. 4, respectively.

At Step S207, a driving control unit 245 determines whether or not an optical zoom of a zoom optical system 243a can be carried out at a zoom magnification calculated by a zoom magnification calculating unit 743. If the driving control unit 745 determines that the optical zoom of the zoom optical system 243a can be carried out at the zoom magnification calculated by the zoom magnification calculating unit 743 (Step S207: Yes), the microscope system 1 makes a transition to Step S208 which will be described below. On the other hand, if the driving control unit 745 determines that the optical zoom of the zoom optical system 243a cannot be carried out at the zoom magnification calculated by the zoom magnification calculating unit 743 (Step S207: No), the microscope system 1 makes a transition to Step S216 which will be described below.

Steps S208 to S215 correspond to the Steps S107 to S114 in FIG. 4, respectively.

At the Step S216, the driving control unit 745 determines whether an objective lens 23 inserted onto an observation light L2 is a high power objective lens 232 or not. More specifically, the driving control unit 745 determines whether or not the objective lens 23 inserted onto an optical path over the observation light L2 is a high power objective lens 232 based on a type signal indicative of a type of the objective lens 23 which is output from a revolver detecting unit 223. If the driving control unit 745 determines that the objective lens 23 inserted onto the observation light L2 is the high power objective lens 232 (Step S216: Yes), the microscope system 1 makes a transition to Step S217 which will be described below. On the other hand, if the driving control unit 745 determines that the objective lens 23 inserted onto the observation light L2 is not the high power objective lens 232 (Step S216: No), the microscope system 1 makes a transition to Step S219 which will be described below.

At the Step S217, the driving control unit 745 sets the zoom magnification of the zoom optical system 243a to a limit value.

Subsequently, a trimming unit 742 sets a trimming region for carrying out a digital zoom based on a current zoom magnification of an optical zoom in a zoom optical system 243a and the zoom magnification calculated by the zoom magnification calculating unit 743 (Step S218). Then, the microscope system 1 makes a transition to the Step S208.

At the Step S219, the driving control unit 745 outputs a switching signal for carrying out switching from the low power objective lens 231 to the high power objective lens 232 to a microscope control unit 3. In this case, the microscope control unit 3 drives a revolver driving unit 222 based on the switching signal input from the driving control unit 745, thereby rotating a mounter 221 to carry out switching from the low power objective lens 231 to the high power objective lens 232, both of which are inserted onto the observation light L2.

Subsequently, the driving control unit 745 outputs a photograph designating signal to an imaging control unit 5, thereby causing an imaging device 4 to pick up an image of a sample S to generate image data and to thus acquire a live image (Step S220).

Then, the driving control unit 745 moves an electrically-driven stage 21 upward and downward in a Z direction, thereby outputting a correction designating signal for correcting a focusing position of the microscope device 2 into the same focal point to the microscope control unit 3 (Step S221). In this case, the microscope control unit 3 drives a motor 212 based on the correction designating signal input from the driving control unit 745, thereby moving the electrically-driven stage 21 upward and downward in the Z direction. Also in a case in which the switching from the low power objective lens 231 to the high power objective lens 232 is carried out, consequently, the microscope device 2 can perform focusing on a sample surface of the sample S.

Thereafter, an AF processing unit 52 acquires a live image stored in an image data storage unit 731 through a control terminal 7 and executes an AF processing based on a contrast of the live image thus acquired (Step S222). After the Step S222, the microscope system 1 makes a transition to the Step S207.

According to the second embodiment of the present invention described above, the driving control unit 745 outputs a driving signal to the zoom driving unit 243b and the revolver driving unit 222 based on a zoom magnification corresponding to a pinch operation. Consequently, a user can enlarge or reduce a desirable observation position on the sample S by a single operation including the switching of the objective lens 23.

Although a position signal output from a touch panel is temporarily stored in a position signal storage unit until the pinch operation is started and is then ended, and the driving control unit acquires the position signal from the position signal storage unit and outputs a driving signal to various electrically-driven units of the microscope system at the end of the pinch operation in the second embodiment, the driving control unit may output a driving signal to the zoom lens unit, the electrically-driven stage and the revolver driving unit in real time corresponding to the pinch operation.

Although the description has been given to the case in which the enlargement is carried out for the execution of the observation in the second embodiment, the present invention can also be applied to the case in which the reduction is carried out for the execution of the observation. Also in that case, in the same manner as in the case of the enlargement for the execution of the observation, it is also possible to decide whether the optical zoom is enabled or not, and it is also possible to reduce the magnification for the observation through the optical zoom if it is decided that the optical zoom is enabled, to decide whether the switching from the high power objective lens 232 to the low power objective lens 231 can be carried out or not if it is decided that the optical zoom is not enabled, and to carry out the switching to the low power objective lens 231 if the switching is enabled.

Third Embodiment

Next, a third embodiment according to the present invention will be described. In the third embodiment, a structure of a control terminal is different from that in the first embodiment. For this reason, the structure of the control terminal in a microscope system according to the third embodiment will be described and a processing to be executed by the microscope system according to the third embodiment will be then explained. The same structures as those in the embodiments have the same reference numerals.

Figure 14:
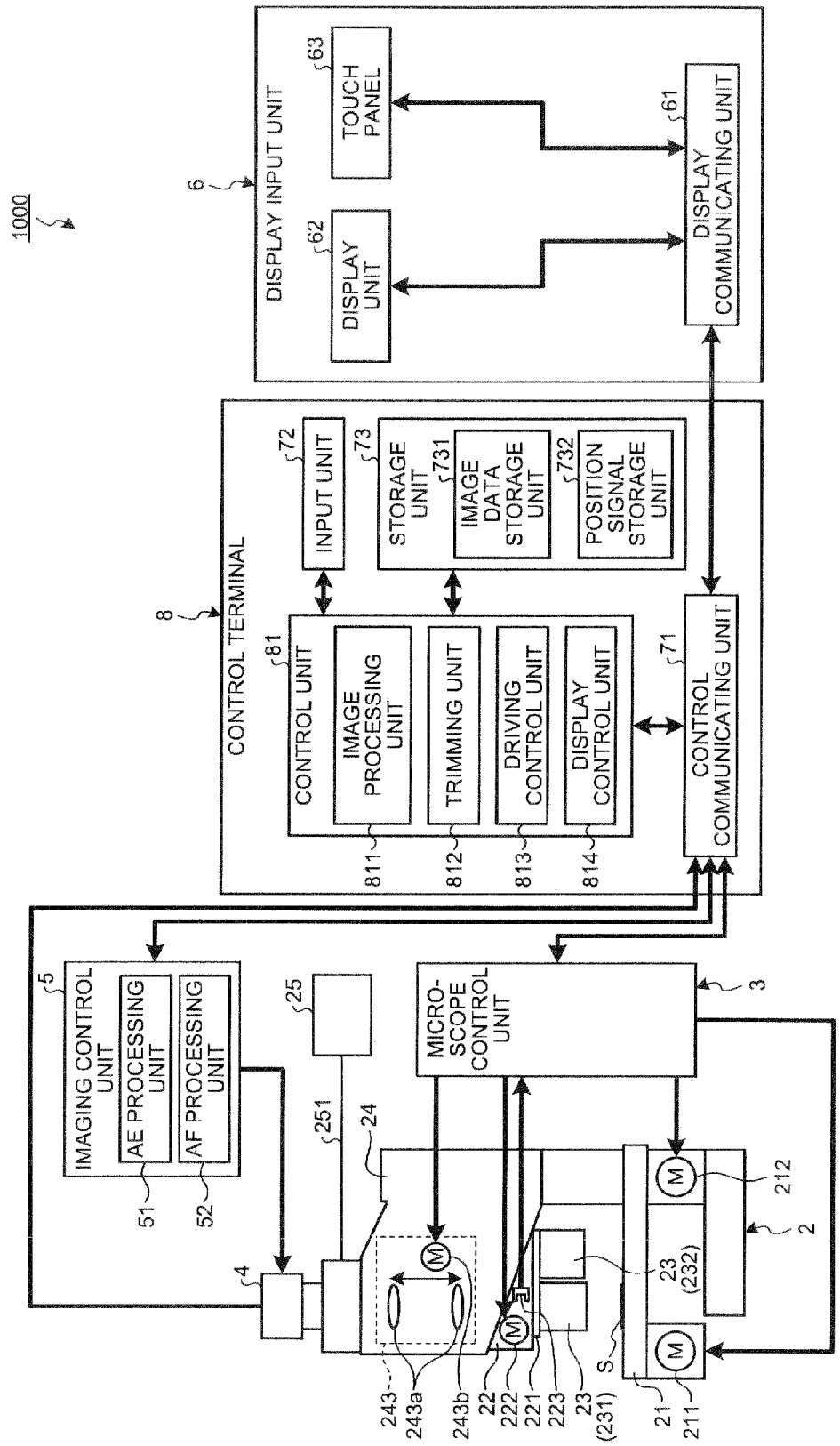
FIG. 14 is a block diagram illustrating a functional structure of a microscope system according to a third embodiment of the present invention.

FIG. 14 is a block diagram illustrating a functional structure of the microscope system according to the third embodiment of the present invention.

A microscope system 1000 illustrated in FIG. 14 includes a microscope device 2 for observing a sample S, a microscope control unit 3 for controlling a driving operation of the microscope device 2, an imaging device 4 for imaging an image of the sample S through the microscope device 2, thereby generating image data, an imaging control unit 5 for controlling a driving operation of the imaging device 4, a display input unit 6 for displaying an image corresponding to the image data imaged by the imaging device 4 through a control terminal 8 and accepting an input of various operations of the microscope system 1000, and the control terminal 8 for controlling the microscope control unit 3, the imaging control unit 5 and the display input unit 6. The microscope device 2, the microscope control unit 3, the imaging device 4, the imaging control unit 5, the display input unit 6 and the control terminal 8 are connected by cable or wirelessly so as to enable a transmission/reception of data.

A control unit 81 is configured by using a CPU or the like, and carries out a designation corresponding to each unit constituting the microscope system 1000 or transfers data in response to a drive designating signal, a position signal, a switching signal and the like which are sent from the input unit 72 and a touch panel 63, thereby controlling the operation of the microscope system 1000 integrally.

The detailed structure of the control unit 81 will be described. The control unit 81 has an image processing unit 811, a trimming unit 812, a driving control unit 813, and a display control unit 814.

The image processing unit 811 carries out a predetermined image processing over the image data input through a control communicating unit 71, thereby generating a display image to be displayed by the display unit 62. More specifically, the image processing unit 811 executes an image processing including an optical black subtraction processing, a white balance adjustment processing, a synchronization processing, a color matrix calculation processing, a γ correction processing, a color reproduction processing, an edge enhancement processing and the like. The image processing unit 811 compresses the image data by a predetermined method, for example, the JPEG method and outputs the compressed image data to an image data storage unit 731.

The trimming unit 812 cuts a predetermined region out of an image corresponding to the image data subjected to the image processing by the image processing unit 811, thereby generating a trimming image.

When the position signal is output from the touch panel 63 and the output of the position signal is stopped, the driving control unit 813 acquires the position signal output from the touch panel 63 which is stored by a position signal storage unit 732 and outputs, to a plurality of electrically-driven units constituting the microscope device 2, a driving signal for driving each of the electrically-driven units. More specifically, the driving control unit 813 outputs the driving signal to an electrically-driven stage 21.

The display control unit 814 controls a display mode of the display unit 62. More specifically, the display control unit 814 causes the display unit 62 to display each image of image data stored in the image data storage unit 731. The display control unit 814 causes the display unit 62 to display operation information about each operation of the microscope system 1000, for example, operation information of the electrically-driven stage 21 or the like.

The microscope system 1000 thus configured can cause a user to observe an image of the sample S by displaying, on the display unit 62, the image data of the sample S, which is imaged by the imaging device 4, under control of the control unit 81. In the microscope system 1000, furthermore, the control unit 81 outputs a designating signal or a driving signal to each unit of the microscope system 1000 based on the position signal input from the touch panel 63, thereby driving the microscope device 2 and the imaging device 4.

Figure 15:
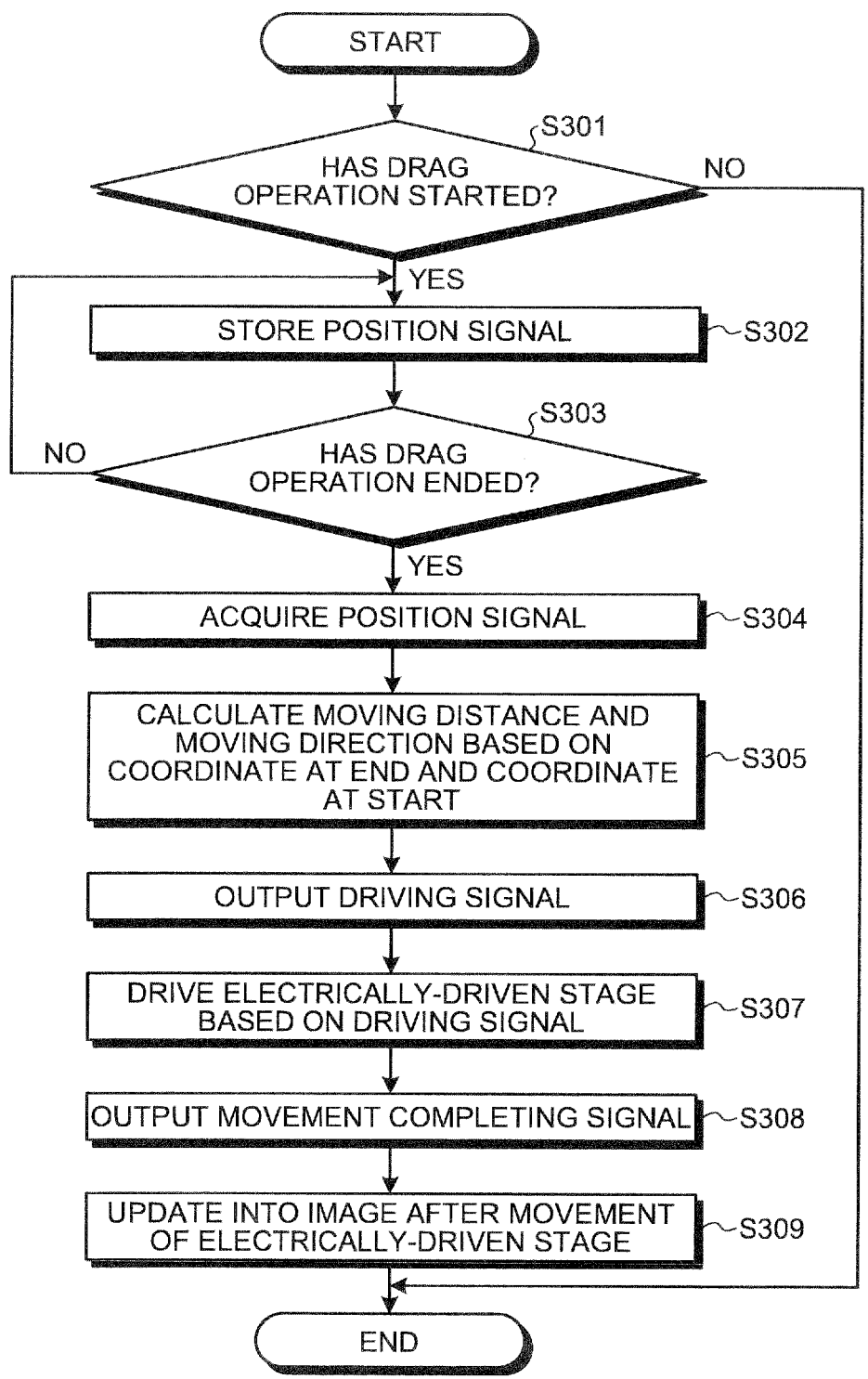
FIG. 15 is a flow chart illustrating a summary of a processing to be executed by the microscope system according to the third embodiment of the present invention.

Next, an operation to be carried out by the microscope system 1000 will be descried. FIG. 15 is a flow chart illustrating a summary of the processing to be carried out by the microscope system 1000. Description will be given by taking the electrically-driven stage 21 as an example of an electrically driven unit of the microscope device 2.

Figure 16:
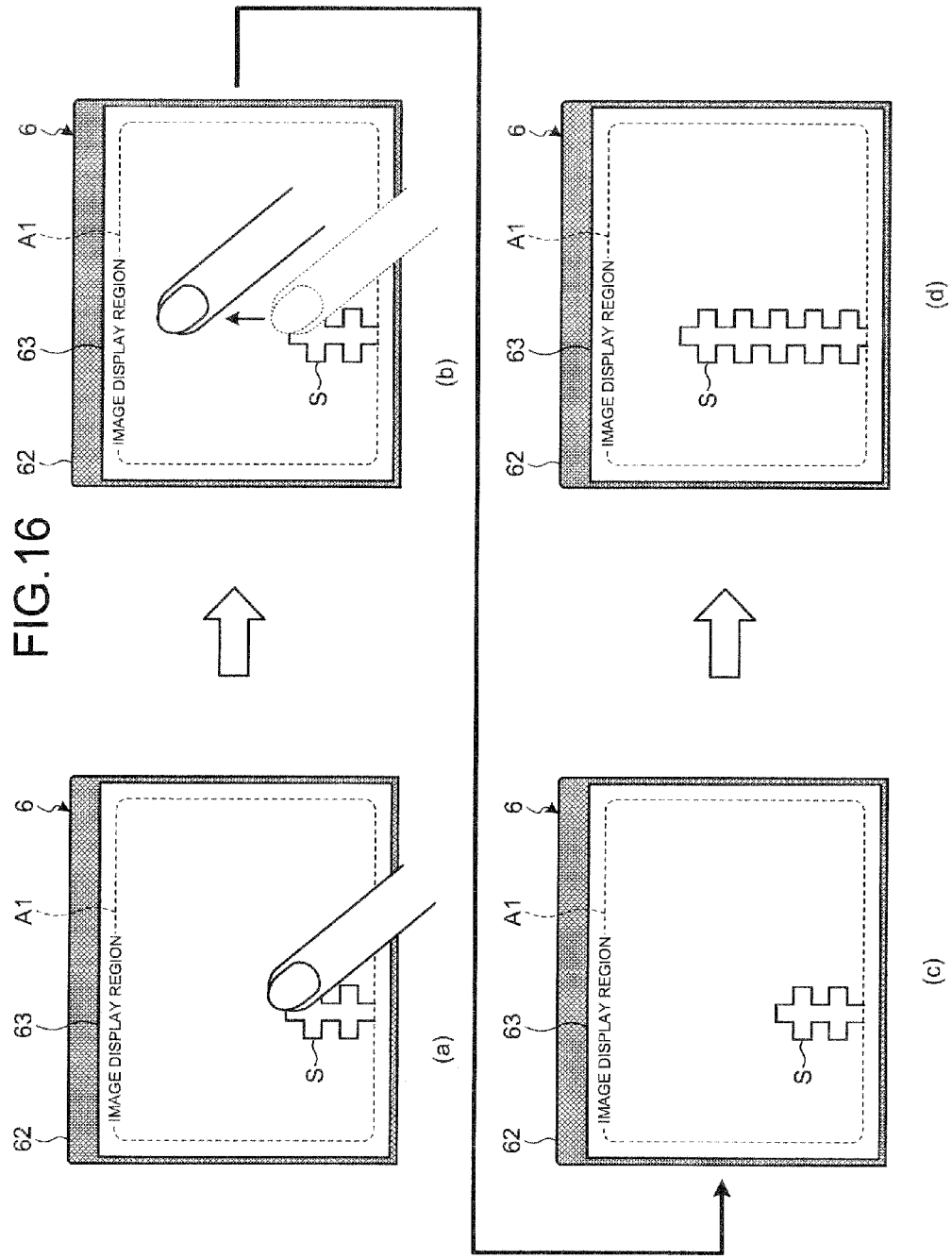
FIG. 16 is a view typically explaining a summary of a drag operation by a user.

As illustrated in FIG. 15, the driving control unit 813 determines whether a drag operation is started over the touch panel 63 or not (Step S301). More specifically, as illustrated in FIG. 16, the driving control unit 813 determines whether or not a user touches the touch panel 63 (FIG. 16(a)) so that a position signal indicative of a contact position is input from the touch panel 63. If the driving control unit 813 determines that the drag operation is started over the touch panel 63 (Step S301: Yes), the microscope system 1000 makes a transition to Step S302. On the other hand, if the driving control unit 813 determines that the drag operation is not started through the touch panel 63 (Step S301: No), the microscope system 1000 ends the present processing.

Subsequently, the driving control unit 813 stores the position signal output from the touch panel 63 in the position signal storage unit 732 (Step S302). In this case, the driving control unit 813 stores the position signal output from the touch panel 63 in time series in the position signal storage unit 732 every predetermined cycle, for example, every pulse when the user continuously touches the touch panel 63 as illustrated in FIG. 16(b).

Then, the driving control unit 813 determines whether the drag operation is ended over the touch panel 63 or not (Step S303). More specifically, as illustrated in FIG. 16, the driving control unit 813 determines whether or not the user separates a finger from the touch panel 63 (FIG. 16(b)→FIG. 16(c)) so that the position signal from the touch panel 63 is stopped. If the driving control unit 813 determines that the drag operation is not ended over the touch panel 63 (Step S303: No), the microscope system 1000 returns to the Step S302. On the other hand, if the driving control unit 813 determines that the drag operation is ended over the touch panel 63 (Step S303: Yes), the microscope system 1000 makes a transition to Step S304.

Next, the driving control unit 813 acquires the position signal stored in the position signal storage unit 732 (Step S304) and calculates a moving distance and a moving direction in which the finger is moved over the touch panel 63 based on coordinates of the end and those of the start of the drag operation included in the position signal which is acquired (Step S305). More specifically, the control unit 81 calculates the moving distance and the moving direction in which the finger is moved over the touch panel 63 based on a straight line connecting a starting position (a starting point) to be a position at which the user first touches the touch panel 63 with the finger and an ending position (an ending point) at which the user separates the finger from the touch panel 63. The moving distance in which the finger is moved over the touch panel 63 is calculated in consideration of a magnification of the objective lens 23 and a zoom magnification of the zoom lens unit 243.

Then, the driving control unit 813 outputs a driving signal for driving the electrically-driven stage 21 to the microscope control unit 3 depending on the moving distance and the moving direction which are calculated (Step S306). The driving signal includes a driving direction and a driving amount in which the electrically-driven stage 21 is to be driven.

Subsequently, the microscope control unit 3 drives the motor 211 based on the driving signal input from the driving control unit 813, thereby driving the electrically-driven stage 21 (Step S307) and outputting a movement completing signal indicative of a moving completion of the electrically-driven stage 21 to the control terminal 8 (Step S308).

Then, the control unit 81 outputs an image designating signal to the imaging control unit 5, thereby causing the imaging device 4 to pick up an image of the sample S subjected to the movement of the electrically-driven stage 21 and thus generating image data, and updates the image to be displayed by the display unit 62 into an image obtained after the movement of the electrically-driven stage 21 (Step S309). More specifically, as illustrated in FIG. 16(d), the image to be displayed by the display unit 62 is updated into the image obtained after the movement of the electrically-driven stage 21. Consequently, the user can confirm a desirable observation place on the sample S which is operated by the touch panel 63.

According to the third embodiment of the present invention described above, when the position signal is output from the touch panel 63 and the output of the position signal is stopped, the driving control unit 813 acquires the position signal output from the touch panel 63 which is to be stored in the position signal storage unit 732 and outputs the driving signal for driving the electrically-driven stage 21 of the microscope device 2 based on the position signal. As a result, the user can move the electrically-driven stage 21 to a desirable place.

According to the third embodiment of the present invention, moreover, the driving control unit 813 temporarily stores the position signal output from the touch panel 63 in the position signal storage unit 732 and the driving amount of the electrically-driven stage 21 is calculated after the operation of the user is ended. Therefore, a control logic can be simplified.

First Modified Example of Third Embodiment

In the third embodiment described above, the user separates the finger from the touch panel 63 so that the driving control unit 813 determines whether the position signal from the touch panel 63 is stopped or not and thus determines whether the drag operation is ended or not. However, in the case in which the position signal output from the touch panel 63 indicates substantially the same position for a certain time, for example, it is also possible to decide that the operation through the touch panel 63 is ended and to acquire the position signal to be stored in the position signal storage unit 732, thereby outputting the driving signal to the microscope control unit 3.

Figure 17:
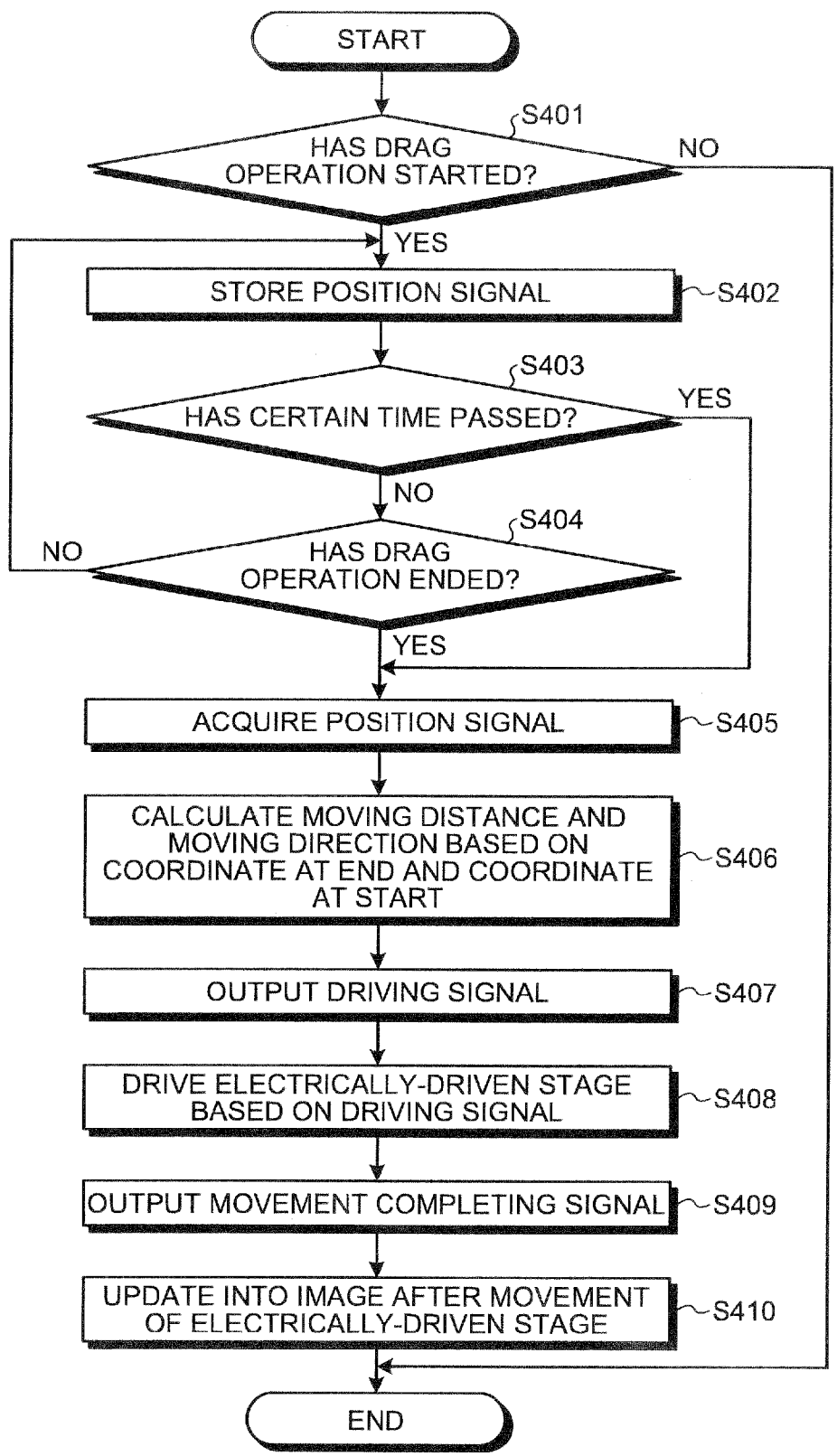
FIG. 17 is a flow chart illustrating a summary of a processing to be executed by a microscope system according to a first modified example of the third embodiment in accordance with the present invention.

FIG. 17 is a flow chart illustrating a summary of a processing to be executed by the microscope system 1000 according to a first modified example of the third embodiment. In the following, description will be given by taking the electrically-driven stage 21 as an example of the electrically-driven unit of the microscope device 2.

As illustrated in FIG. 17, Steps S401 to S402 correspond to the Steps S301 to S302 in FIG. 15, respectively.

At Step S403, the driving control unit 813 determines whether or not the position signal output from the touch panel 63 indicates almost the same position of the touch panel 63 for a certain time (for example, one second). If the control unit 81 determines that the position signal output from the touch panel 63 indicates almost the same position for the certain time (Step S403: Yes), the microscope system 1000 makes a transition to Step S405. On the other hand, if the control unit 81 determines that position information output from the touch panel 63 does not indicate almost the same position for the certain time (Step S403: No), the microscope system 1000 makes a transition to Step S404.

The Steps S404 to S410 correspond to the Steps S303 to S309 in FIG. 15, respectively.

According to the first modified example of the third embodiment in accordance with the present invention described above, in the case in which the position signal output from the touch panel 63 indicates substantially the same position of the touch panel 63 for more than the certain time, the driving control unit 813 determines that the operation of the touch panel 63 is ended and acquires the position signal stored in the position signal storage unit 732, and outputs the driving signal for driving the electrically-driven stage 21 of the microscope device 2 based on the position signal. As a result, the electrically-driven stage 21 can be driven gradually by following the operation of the user and can be moved rapidly to a position desired by the user.

Second Modified Example of Third Embodiment

Although the operation of only the electrically-driven stage 21 has been described as the electrically-driven unit in the third embodiment, the driving control unit 813 may control the drive of the electrically-driven stage 21 and the adjustment of the focusing position of the imaging device 4 at the same time when the position signal is output from the touch panel 63 and is stopped. In this case, when the position signal to be output from the touch panel 63 is stopped, the driving control unit 813 acquires the position signal to be stored in the position signal storage unit 732 and generates a driving signal of the electrically-driven stage 21 and a designating signal for adjusting the focusing position of the imaging device 4 based on the position signal which is acquired, respectively. Then, the driving control unit 813 outputs the driving signal and the designating signal to the microscope control unit 3 and the imaging control unit 5, respectively.

According to the second modified example of the third embodiment, thus, the user can carry out a movement to a desirable observation position on the sample S by only one operation over the touch panel 63 and can confirm a focused image of the imaging device 4 in the observation position.

Third Modified Example of Third Embodiment

Although the description has been given to the movement over the XY plane in the electrically-driven stage 21 in the first embodiment, it may also carry out a driving control in the Z direction of the electrically-driven stage 21. In this case, when the position signal is output from the touch panel 63 and the output of the position signal is stopped, the driving control unit 813 determines that the operation of the touch panel 63 is ended and acquires the position signal to be stored in the position signal storage unit 732, and generates a driving signal for designating a driving operation in the Z direction of the electrically-driven stage 21 based on the position signal thus acquired. Then, the driving control unit 813 outputs the driving signal to the microscope control unit 3.

According to the third modified example of the third embodiment, thus, the driving control unit 813 temporarily stores the position signal output from the touch panel 63 in the position signal storage unit 732 and calculates a driving amount in the Z direction of the electrically-driven stage 21 after the operation of the user is ended. Therefore, it is possible to simplify a control logic. In addition, the electrically-driven stage 21 can be moved smoothly in the Z direction by following the operation of the user.

Fourth Embodiment

Next, a fourth embodiment according to the present invention will be described. A microscope system according to the fourth embodiment of the present invention is different from the microscope system according to the third embodiment described above in respect of only an operation thereof, and has the same structure as that of the microscope system according to the third embodiment described above. For this reason, description will be given to the operation to be carried out by the microscope system according to the fourth embodiment of the present invention.

Figure 18:
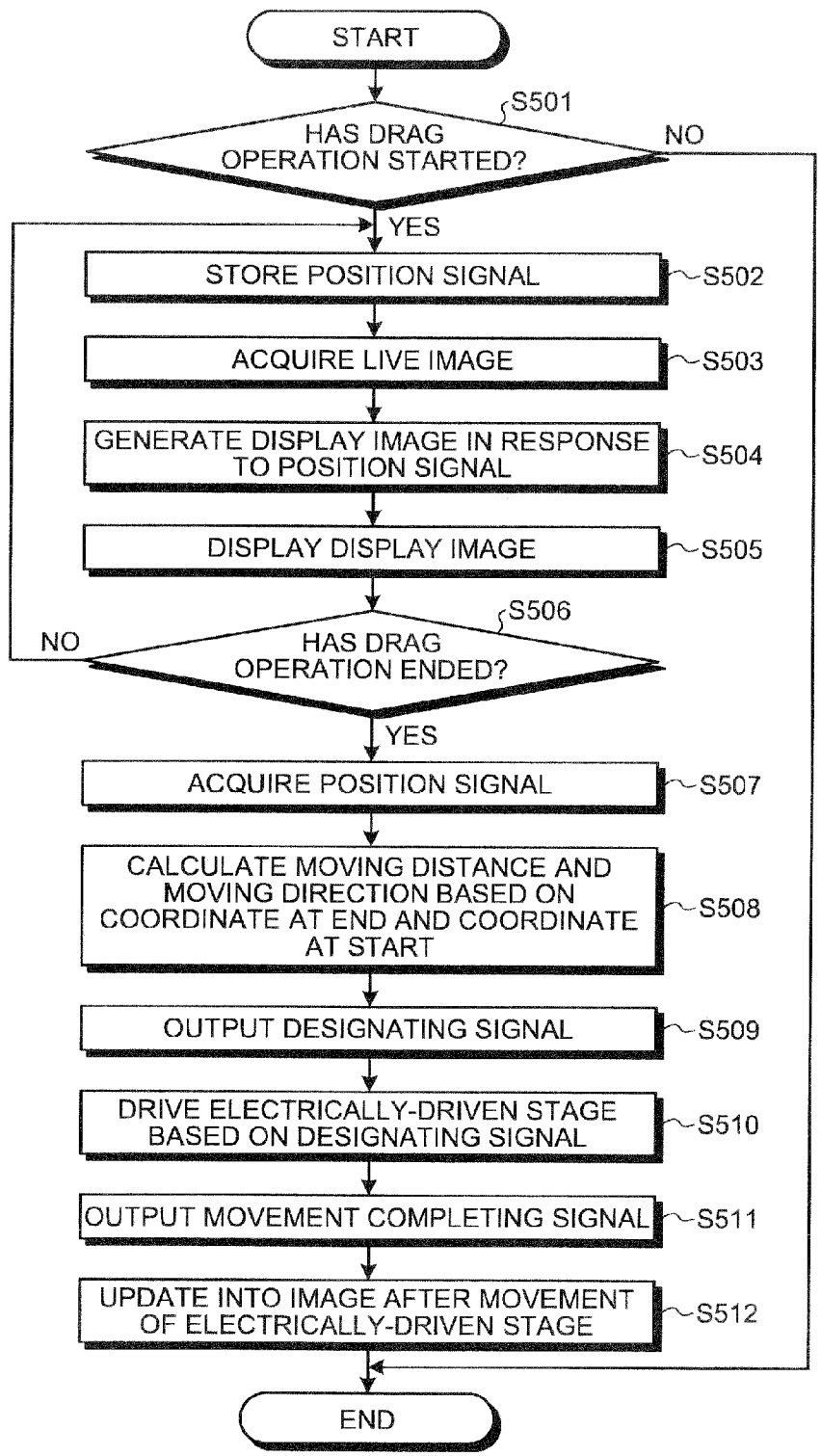
FIG. 18 is a flow chart illustrating a summary of a processing to be executed by a microscope system according to a fourth embodiment of the present invention.

FIG. 18 is a flow chart illustrating a summary of a processing to be executed by the microscope system 1000 according to the fourth embodiment.

As illustrated in FIG. 18, Steps S501 and S502 correspond to the Steps S301 and S302 in FIG. 15, respectively.

At Step S503, a driving control unit 813 outputs a designating signal for designating an imaging operation of an imaging device 4 to an imaging control unit 5, thereby causing the imaging device 4 to generate image data and acquiring a live image corresponding to the image data.

Subsequently, a trimming unit 812 generates a display image for displaying the live image on a display unit 62 in response to a position signal output from a touch panel 63 (Step S504). More specifically, the trimming unit 812 cuts a region setting the position signal output from the touch panel 63 as a center out of the live image in a display region of the display unit 62 corresponding to the position signal output from the touch panel 63, thereby generating a trimming image as a display image.

Then, a display control unit 814 causes the display unit 62 to display the display image generated by the trimming unit 812 (Step S505).

Subsequently, the driving control unit 813 determines whether a drag operation is ended or not (Step S506). If the driving control unit 813 determines that the drag operation is ended (Step S506: Yes), the microscope system 1000 makes a transition to Step S507. On the other hand, if the driving control unit 813 determines that the drag operation is not ended (Step S506: No), the microscope system 1000 returns to the Step S502.

Steps S507 to S512 correspond to the Steps S304 to S309 in FIG. 15, respectively.

According to the fourth embodiment of the present invention described above, when the position signal is output from the touch panel 63, the driving control unit 813 outputs the designating signal for designating the imaging operation of the imaging device 4 to the imaging control unit 5, thereby causing the imaging device 4 to generate image data and generating, every predetermined interval, a trimming image as a display image from a corresponding image to image data in response to the position signal output from the touch panel 63 by the trimming unit 812, updating the trimming image as the display image corresponding to the position signal output from the touch panel 63 which is generated every predetermined time by the trimming unit 812 and displaying the updated trimming image on the display unit 62 by the display control unit 814. As a result, the user virtually updates only the image by following the operation carried out for the touch panel 63. Therefore, the user can observe a sample S promptly.

Fifth Embodiment

Next, a fifth embodiment according to the present invention will be described. A microscope system according to the fifth embodiment of the present invention is different from the microscope system according to the third embodiment described above in respect of only an operation thereof, and has the same structure as that of the microscope system according to the third embodiment described above. For this reason, description will be given to the operation to be carried out by the microscope system according to the fifth embodiment of the present invention.

Figure 19:
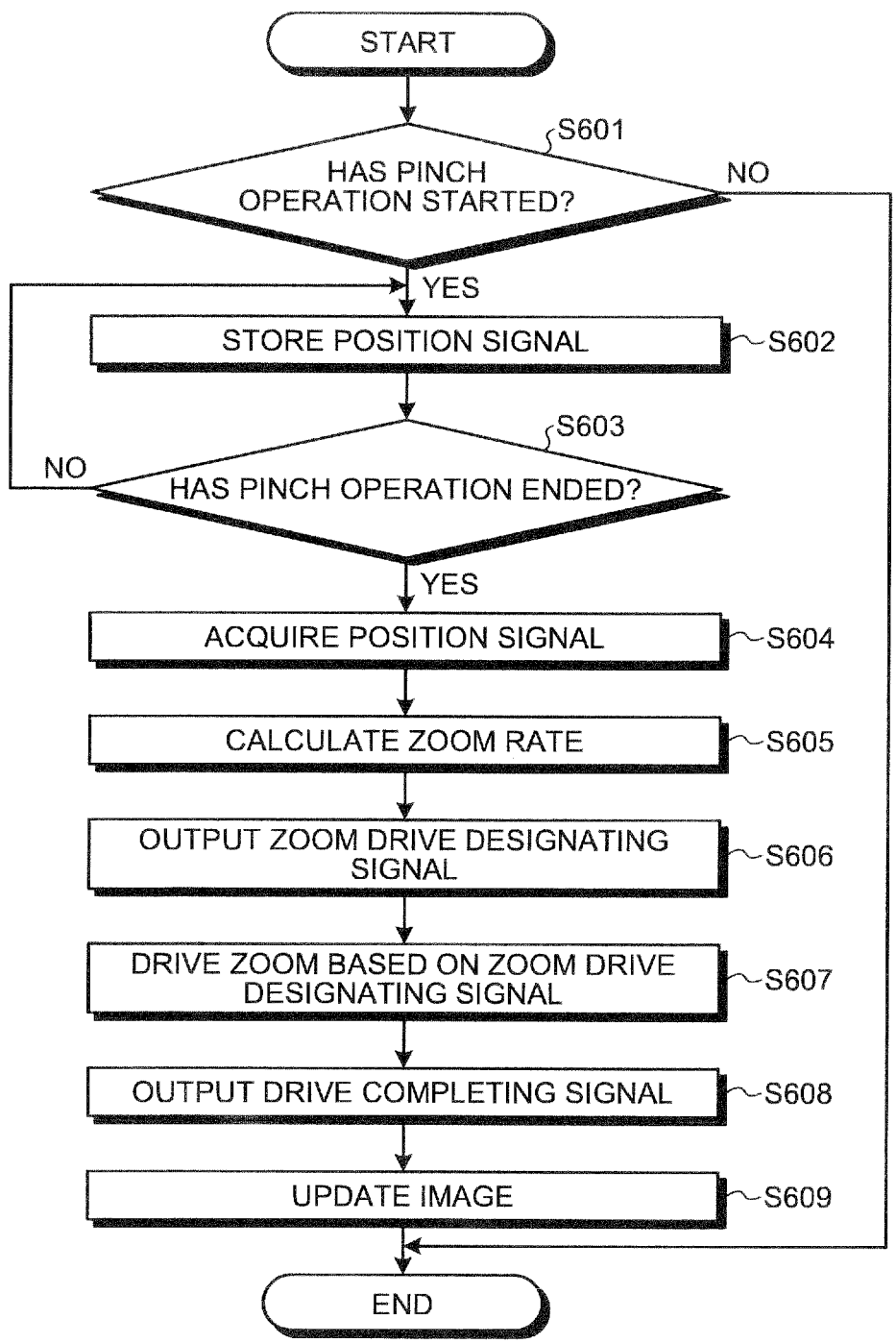
FIG. 19 is a flow chart illustrating a summary of a processing to be executed by a microscope system according to a fifth embodiment of the present invention.

FIG. 19 is a flow chart illustrating a summary of a processing to be executed by the microscope system 1000 according to the fifth embodiment. In the fifth embodiment, description will be given by taking a zoom lens unit 243 as an example of an electrically-driven unit of a microscope device 2.

As illustrated in FIG. 19, a driving control unit 813 determines whether or not a pinch operation is started over a touch panel 63 (Step S601). More specifically, as illustrated in FIG. 20, a control unit 81 determines whether or not a user touches two places of the touch panel 63 (FIG. 20(a)) so that two position signals indicative of different contact positions are output from the touch panel 63. If a driving control unit 813 determines that the pinch operation is stared over the touch panel 63 (Step S601: Yes), the microscope system 1000 makes a transition to Step S602. On the other hand, if the driving control unit 813 determines that the pinch operation is not started through the touch panel 63 (Step S601: No), the microscope system 1000 ends the present processing.

Subsequently, the driving control unit 813 stores the position signal of the touch panel 63 corresponding to the two position signals output from the touch panel 63 in a position signal storage unit 732 (Step S602).

Then, the driving control unit 813 determines whether the pinch operation is ended over the touch panel 63 or not (Step S603). More specifically, as illustrated in FIG. 20, the driving control unit 813 determines whether or not the user separates either or both of fingers from the touch panel 63 (FIG. 20(b) →FIG. 20(c)) so that the output of either or both of the position signals is stopped through the touch panel 63, thereby deciding whether the pinch operation is ended or not. If the driving control unit 813 determines that the pinch operation is ended over the touch panel 63 (Step S603: Yes), the microscope system 1000 makes a transition to Step S604. On the other hand, if the driving control unit 813 determines that the pinch operation is not ended (Step S603: No), the microscope system 1000 returns to the Step S602.

At the Step S604, the driving control unit 813 acquires position information stored in the position signal storage unit 732 and calculates the zoom magnification of the zoom lens unit 243 based on the position information thus acquired (Step S605). More specifically, the driving control unit 813 calculates a zoom rate of the zoom lens unit 243 based on a ratio of a straight line connecting two positions at the start of the pinch operation to a straight line connecting two positions at the end of the pinch operation.

Subsequently, the driving control unit 813 outputs a zoom drive designating signal corresponding to the zoom magnification, which is calculated, to a microscope control unit 3 (Step S606).

Then, the microscope control unit 3 drives a zoom driving unit 243b based on the zoom drive designating signal, thereby driving a zoom optical system 243a along an optical axis (Step S607) and outputting a drive completing signal to the control unit 81 when the driving operation of the zoom optical system 243a is completed (Step S608).

Next, the driving control unit 813 outputs an image designating signal to the imaging control unit 5, thereby causing an imaging device 4 to pick up an image of a sample S subjected to zooming and to generate image data, and updating an image to be displayed by a display unit 62 into an image subjected to the zooming (Step S609). More specifically, as illustrated in FIG. 20(d), the display unit 62 displays the image of the sample S which is enlarged by the pinch operation. Thereafter, the microscope system 1000 ends the present processing.

According to the fifth embodiment of the present invention described above, when the position signal is output from the touch panel 63 and the output of the position signal is stopped, the driving control unit 813 acquires the position signal stored in the position signal storage unit 732 and outputs the driving signal for driving the zoom lens unit 243 of the microscope device 2 based on the position signal. As a result, the user can enlarge the sample S into a desirable magnification, thereby carrying out the observation.

Although the description has been given by taking a pinch-out operation for enlarging the sample S as an example of the pinch operation in the fifth embodiment according to the present invention, the present invention can also be applied to a pinch-in operation for reducing the sample S. The pinch-out operation represents that a distance between two touch positions at which the user touches the touch panel 63 in different positions is increased toward an outer edge of the touch panel 63. Also, the pinch-in operation represents that the distance between the two touch positions at which the user touches the touch panel 63 in different positions is reduced toward the center of the touch panel 63.

Although the driving control unit 813 carries out the enlargement or the reduction depending on the pinch operation in the fifth embodiment according to the present invention, moreover, the sample S may be enlarged or reduced corresponding to a track of the position signal output from the touch panel 63, for example.

Although the driving control unit 813 enlarges the sample S by the zoom lens unit 243 and then updates the image to be displayed by the display unit 62 in the fifth embodiment according to the present invention, moreover, the image may be updated by causing the trimming unit 812 to generate a trimming image to be a display image in response to the position signal output from the touch panel 63 in the same manner as in the embodiments described above. In this case, the driving control unit 813 can cause the user to virtually observe an image of the enlarged sample S by designating a size of the trimming image generated through cut-out from an observed image by the trimming unit 812 corresponding to the pinch operation.

In the fifth embodiment according to the present invention, moreover, the driving control unit 813 outputs the driving signal to the zoom lens unit 243 when the output of the position signal from the touch panel 63 is stopped. However, the driving signal may be output to the electrically-driven stage 21 and the zoom lens unit 243 at the same time, respectively. Consequently, the user can carry out the observation in a desirable position and magnification of the sample S by a single operation.

Although the microscope system including the microscope device, the imaging device, the display input unit and the control terminal has been described as an example in the present invention, the present invention can also be applied to an objective lens for enlarging a sample, an imaging device having an imaging function for imaging an image of a sample through an objective lens and a display function for displaying an image, for example, a video microscope, and the like.

Although the description has been given to an upright type microscope device as an example of the microscope device in the present invention, moreover, the present invention can also be applied to an inclination type microscope device, for example. Furthermore, the present invention can also be applied to various systems, for example, a line device incorporating a microscope device.

Although the display input unit and the control terminal are configured separately in the present invention, moreover, it may be employed in a portable terminal in which the display input unit and the control terminal are formed integrally, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system for driving each of electrically-driven units included in a microscope device to observe a sample, comprising:
   a zoom optical system configured by at least one lens and capable of carrying out zooming over the sample;
   a zoom driving unit for moving the zoom optical system along an optical axis;
   an imaging unit for imaging an observation image of the sample through the zoom optical system, thereby generating image data on the sample;
   a display unit for displaying an image corresponding to the image data generated by the imaging unit;
   a touch panel provided on a display screen of the display unit for accepting an input corresponding to a contact position of an object from an outside; and
   a driving control unit for outputting, to the zoom driving unit, a driving signal for changing a zoom magnification of the zoom optical system by setting a middle point between contact positions on the touch panel corresponding to two position signals in response to an input of the different contact positions as a zoom center position fixed without depending on a zoom magnification of the zoom optical system when the two position signals are output from the touch panel.

2. The microscope system according to claim 1, further comprising an electrically-driven stage on which the sample is mounted and which can be moved in a horizontal direction,
   wherein the driving control unit outputs a driving signal for driving the electrically-driven stage to a position in which the zoom center position to be displayed on the image before and after a change in the zoom of the zoom optical system is displayed in almost the same display position.

3. The microscope system according to claim 1, wherein the driving control unit outputs a driving signal for enlarging the zoom magnification of the zoom optical system when a distance between two contact positions corresponding to the two position signals respectively is increased with time, and outputs a driving signal for reducing the zoom magnification of the zoom optical system when the distance between the two contact positions corresponding to the two position signals respectively is reduced with time.

4. The microscope system according to claim 1, further comprising a zoom magnification calculating unit for calculating a zoom magnification of the zoom optical system based on a ratio of lengths before and after a change in the distance between the two contact positions and the zoom magnification of the zoom optical system immediately after a start of the change in the distance between the two contact positions, wherein the driving control unit outputs, to the zoom driving unit, a driving signal corresponding to the zoom magnification calculated by the zoom magnification calculating unit.

5. The microscope system according to claim 4, further comprising:
a revolver including a plurality of objective lenses having different magnifications from each other; and
a revolver driving unit for alternatively switching the objective lenses over an optical path for an observation light of the sample,
wherein the driving control unit outputs, to the zoom driving unit and the revolver driving unit, a driving signal corresponding to an overall zoom magnification determined by a combination of a magnification of the objective lens and the zoom magnification of the zoom optical system.

6. The microscope system according to claim 5, wherein the driving control unit outputs a driving signal to the zoom driving unit, an electrically-driven stage and the revolver driving unit when at least one of the two position signals output from the touch panel is stopped.

7. The microscope system according to claim 1, further comprising a display control unit for causing the display unit to display the middle point with information which can be identified.

8. The microscope system according to claim 7, wherein the display control unit causes the display unit to display a zoom region corresponding to a variation in a distance between the two contact positions as information which can be identified.

9. The microscope system according to claim 8, wherein the display control unit causes the display unit to display the zoom magnification of the zoom optical system corresponding to the variation in the distance between the two contact positions.

10. A microscope system for driving each of electrically-driven units included in a microscope device to observe a sample, comprising:
a display unit for displaying an image corresponding to image data obtained by imaging an image of the sample and displaying operation information about a driving operation of each of the electrically-driven units;
a touch panel provided on a display screen of the display unit for accepting an input corresponding to a contact position of an object from an outside;
a storage unit for storing a position signal in response to an input of the contact position which is output from the touch panel; and
a driving control unit for acquiring the position signal stored in the storage unit and outputting respective driving signals for driving the electrically-driven units to the electrically-driven units based on the position signal when the position signal is output from the touch panel and the output of the position signal is stopped.

11. The microscope system according to claim 10, wherein the driving control unit acquires the position signal stored in the storage unit and outputs the driving signal when the position signal is a corresponding signal to substantially the same position on the touch panel beyond a certain time.

12. The microscope system according to claim 10, wherein the storage unit stores a starting position to be a position at which the object first touches the touch panel and an ending position to be a position at which the object separates from the touch panel, and
the driving control unit calculates each driving amount of the electrically-driven units based on the starting position and the ending position.

13. The microscope system according to claim 10, wherein the driving control unit outputs the driving signal to the electrically-driven unit when at least one of the two position signals in response to an input of the different contact positions is not output in the case in which the touch panel starts to output the position signals.

14. The microscope system according to claim 10, wherein the electrically-driven unit at least has an electrically-driven stage on which the sample is mounted and which can be moved over a plane and/or a zoom lens unit for enlarging the sample.

15. The microscope system according to claim 10, wherein the electrically-driven unit at least has an electrically-driven stage on which the sample is mounted and which can be moved over a plane and a zoom lens unit for enlarging the sample, and
the driving control unit outputs a driving signal for driving the electrically-driven stage and a driving signal for driving the zoom lens unit at the same time.

16. The microscope system according to claim 10, further comprising:
an imaging device for imaging an image of the sample to generate observation image data of the sample; and
a display control unit for causing the display unit to display an observation image corresponding to the observation image data generated by the imaging device,
wherein the driving control unit outputs a photograph designating signal for designating the photographing to the imaging device when the position signal is output from the touch panel, and
the display control unit updating the observation image every predetermined time, thereby causing the display unit to display the updated observation image.

17. The microscope system according to claim 16, further comprising a trimming unit for cutting a region corresponding to a display region of the display unit out of the observation image, thereby generating a display image,
wherein the driving control unit outputs a designating signal for designating a position in which the trimming unit cuts the display image out of the observation image based on the position signal output from the touch panel.

18. The microscope system according to claim 17, wherein the trimming unit generates the display image every predetermined time when the touch panel continuously outputs the position signal, and
the display control unit causes the display unit to display the display image generated by the trimming unit.

* * * * *

UNITED STATES PATENT AND TRADEMARK OFFICE
CERTIFICATE OF CORRECTION

PATENT NO. : 8,922,639 B2  
APPLICATION NO. : 13/618258  
DATED : December 30, 2014  
INVENTOR(S) : So Hibino et al.

It is certified that error appears in the above-identified patent and that said Letters Patent is hereby corrected as shown below:

On the Title page; Item (75) Inventors:

change "Testsuya" to --Tetsuya--.

Signed and Sealed this  
Fifth Day of May, 2015

Michelle K. Lee  
*Director of the United States Patent and Trademark Office*